United States Patent
Kondo et al.

(10) Patent No.: US 7,844,136 B2
(45) Date of Patent: Nov. 30, 2010

(54) APPARATUS AND METHOD FOR GENERATING COEFFICIENTS, APPARATUS AND METHOD FOR GENERATING CLASS CONFIGURATION, INFORMATIONAL SIGNAL PROCESSING APPARATUS, AND PROGRAMS FOR PERFORMING THESE METHODS

(75) Inventors: Tetsujiro Kondo, Tokyo (JP); Takeshi Miyai, Tokyo (JP); Daisuke Kikuchi, Tokyo (JP); Shizuo Chikaoka, Tokyo (JP); Takashi Nakanishi, Tokyo (JP); Yoshiaki Nakamura, Tokyo (JP); Tsugihiko Haga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1036 days.

(21) Appl. No.: 11/564,598

(22) Filed: Nov. 29, 2006

(65) Prior Publication Data

US 2007/0098269 A1    May 3, 2007

Related U.S. Application Data

(62) Division of application No. 10/854,157, filed on May 27, 2004, now Pat. No. 7,262,808.

(30) Foreign Application Priority Data

May 29, 2003    (JP)    ............................. 2003-153434

(51) Int. Cl.
*G06K 9/32*    (2006.01)
(52) U.S. Cl. ...................................... 382/299; 348/458

(58) Field of Classification Search .................... None
See application file for complete search history.

(56) References Cited

U.S. PATENT DOCUMENTS 7,262,808 B2 *    8/2007    Kondo et al. ................ 348/448

FOREIGN PATENT DOCUMENTS

| JP | 7-95591 | 4/1995 |
| JP | 9-214900 | 8/1997 |
| JP | 2000-59740 | 2/2000 |
| JP | 2000-69434 | 3/2000 |
| JP | 2000-69435 | 3/2000 |
| JP | 2000-83225 | 3/2000 |

* cited by examiner

*Primary Examiner*—Bhavesh M Mehta
*Assistant Examiner*—Gregory F Cunningham
(74) *Attorney, Agent, or Firm*—Oblon, Spivak, McClelland, Maier & Neustadt, L.L.P.

(57) ABSTRACT

A class configuration generation unit generates (n−1) number of class configurations each of which is comprised of i number of the already selected features plus a feature selected from the remaining (n−i) number of the features (both of n and i are integers). A class configuration selection unit selects an optimal class configuration from the (n−i) number of the class configurations using an arbitrary evaluation value. The features used in the class configuration selected by the selection unit are used as the already selected features in the generation unit. The operations by the generation unit and the selection unit are repeated with values of i sequentially varying from 0 to r−1, thereby generating a class configuration comprised of r number of the features.

10 Claims, 21 Drawing Sheets

F I G. 3
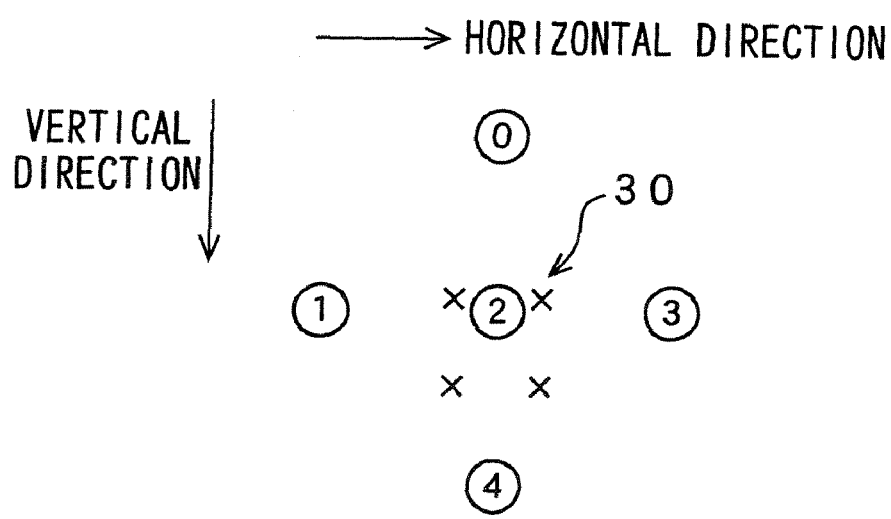
F I G. 4
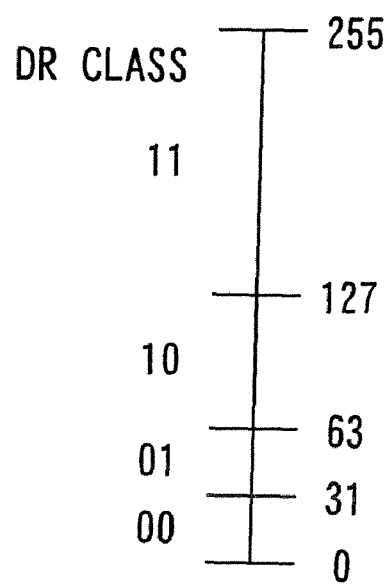

FIG. 10A          FIG. 10B          FIG. 10C 000000000000                        000000000000
000000000001                        000000000001
000000000010                        000000000000
000000000011                        000000000001
..                                  ....
000001110010                        000001000000
000001110011    &  000001000001 =   000001000001
000001110100                        000001000000
..                                  ....
010001001011                        000001000001
..                                  ....
011100001100                        000000000000
..                                  ....

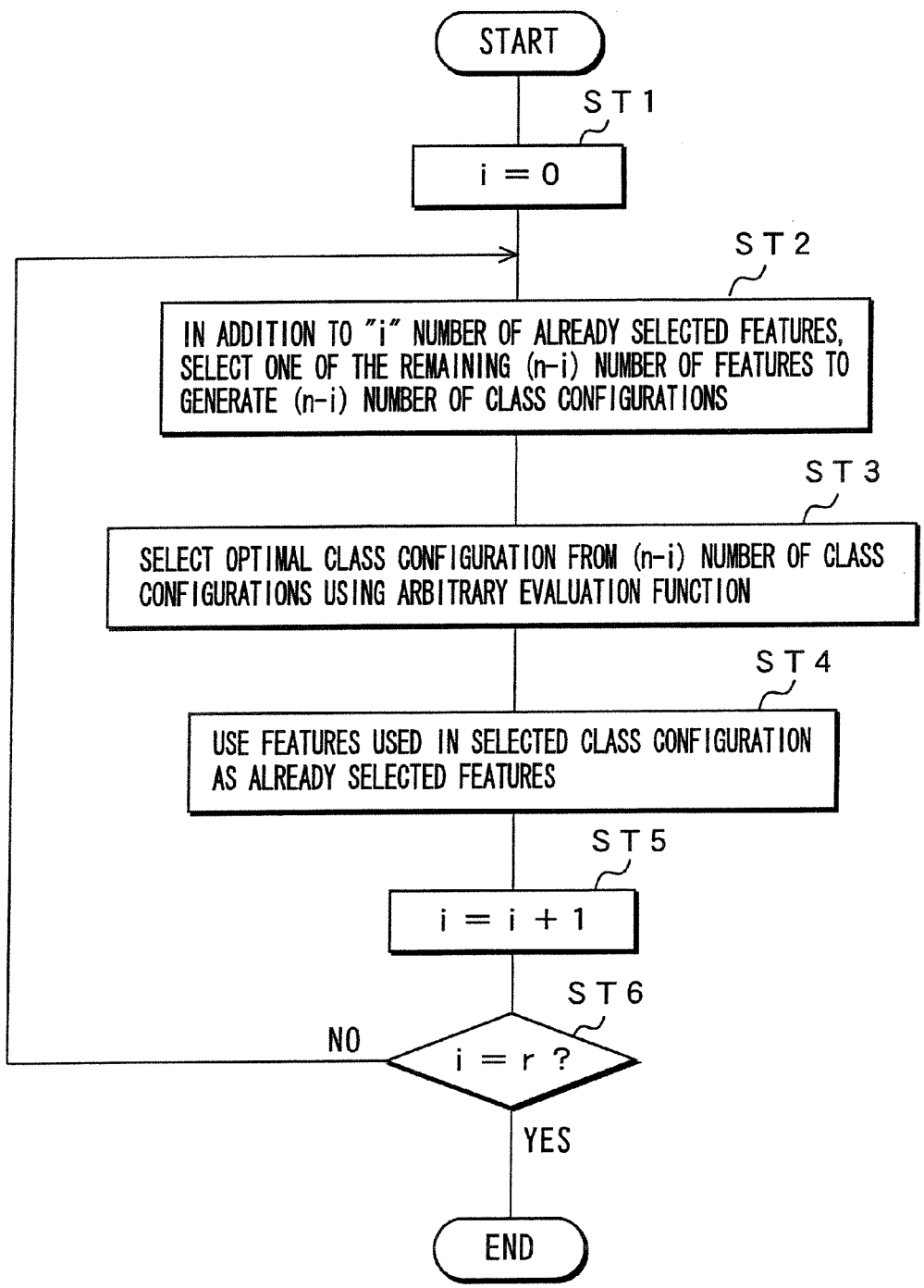

APPARATUS AND METHOD FOR GENERATING COEFFICIENTS, APPARATUS AND METHOD FOR GENERATING CLASS CONFIGURATION, INFORMATIONAL SIGNAL PROCESSING APPARATUS, AND PROGRAMS FOR PERFORMING THESE METHODS

CROSS REFERENCE TO RELATED APPLICATIONS

This application is a divisional of U.S. application Ser. No. 10/854,157, filed May 27, 2004, and is based upon and claims the benefit of priority from the prior Japanese Patent Application No. 2003-153434, filed on May 29, 2003, the entire contents of each of which are incorporated herein by reference.

BACKGROUND OF THE INVENTION

1. Field of the Invention

The present invention relates to an apparatus and method for generating a coefficient, an apparatus and method for generating a class configuration, an informational signal processing apparatus, and programs for performing these methods. More specifically, it relates to an apparatus and method for generating a coefficient and the like suitable for being well applied to an apparatus for converting a standard TV signal (SD signal) into a high-resolution signal (HD signal) and the like.

2. Description of Related Art

In recent years, a variety of technologies have been proposed for improving a resolution or a sampling frequency of an image or audio signal. For example, it is known that in a case where a standard TV signal suited to a standard or low resolution is upgraded to a high-resolution signal, a so-called HDTV signal or where it undergoes sub-sample interpolation, conversion processing accompanied by class categorization gives a better result in performance than an approach by means of conventional linear interpolation.

According to this conversion processing accompanied by the class categorization, for example, in the case of converting a standard TV signal (SD signal) suited to a standard or low resolution into a high-resolution signal (HD signal), a class to which pixel data of a target position in the HD signal belongs is detected from a predetermined class configuration, so that using coefficient data for an estimation equation that corresponds to this class, the pixel data of the target position in the HD signal is generated from multiple items of pixel data of the SD signal based on this estimation equation. The coefficient data for the estimation equation used in this conversion processing accompanied by the class categorization is determined by performing learning such as least-squares method beforehand for each class.

However, to perform this conversion processing accompanied by class categorization, a class configuration (a combination of features) required to perform class categorization must be determined. Although generally the performance becomes better as the features are used more, an amount of the coefficient data or coefficient seed data which is coefficient data of a generation equation for generating this coefficient data may become enormous, or the calculation therefor may involve an immense amount of time. To solve this problem, it is important to determine an appropriate class configuration.

To determine the class configuration, it has conventionally been necessary to consider a few class configuration candidates obtained through human experiences in the past, perform learning separately for each class configuration, and select a seemingly best one of the class configurations based on a result of the learning. Therefore, the human experiences are always relied on and the learning is always repeated from the beginning for each time the class configuration is changed, thus resulting in enormous time required for that.

It is an object of the present invention to efficiently generate coefficient data etc. for each class in an arbitrary class configuration by performing learning only once. It is another object of the present invention to obtain an optimal class configuration in short time without relying on human experiences. It is a further object of the present invention to convert a first informational signal into a second informational signal by performing conversion processing accompanied by class categorization by use of an optimal configuration.

SUMMARY OF THE INVENTION

According to an aspect of the invention, there provides a coefficient generation apparatus for generating coefficient data for an estimation equation which is used for converting a first informational signal comprised of multiple items of informational data into a second informational signal comprised of multiple items of informational data or coefficient seed data that is coefficient data in a generation equation for generating the coefficient data for the estimation equation. The apparatus comprises a storage unit for storing a normal equation for calculating the coefficient data for the estimation equation or the coefficient seed data for each class in a basic class configuration comprised of all of plural features. The apparatus also comprises a normal equation generation unit for, based on information of a target class configuration comprised of arbitrary one or more features of the plural features, generating a normal equation for calculating the coefficient data for the estimation equation or the coefficient seed data for each class in the target class configuration. The apparatus further comprises a calculation unit for solving the normal equation, which is generated by the normal equation generation unit, and for calculating the coefficient data for the estimation equation or the coefficient seed data for each class in the target class configuration to calculate for each class the coefficient data for the estimation equation or the coefficient seed data.

According to another aspect of the invention, there provides a coefficient generation method for generating coefficient data for an estimation equation which is used for converting a first informational signal comprised of multiple items of informational data into a second informational signal comprised of multiple items of informational data or coefficient seed data that is coefficient data in a generation equation for generating the coefficient data for the estimation equation. The method comprises the step of preparing a normal equation for calculating the coefficient data for the estimation equation or the coefficient seed data for each class in a basic class configuration comprised of all of plural features. The method also comprises the step of generating a normal equation for calculating the coefficient data for the estimation equation or the coefficient seed data for each class in the target class configuration, based on information of a target class configuration comprised of at least arbitrary one of the plural features. The method further comprises the step of solving the generated normal equation for calculating the coefficient data for the estimation equation or the coefficient seed data for each class in the target class configuration to calculate for each class the coefficient data for the estimation equation or the coefficient seed data for each class in the target class configuration. Further, according to an additional aspect of the invention, there provides a program for commanding a computer to execute the above coefficient generation method.

In the present invention, the coefficient data for an estimation equation which is used for converting first informational signal comprised of multiple items of informational data into a second informational signal comprised of multiple items of informational data or coefficient seed data (coefficient data etc.) that is coefficient data in a generation equation for generating the coefficient data for the estimation equation is generated. These informational signals are each, for example, an image signal or an audio signal.

A normal equation for calculating the coefficient data or the coefficient seed data of each class in a basic class configuration comprised of all of plural features is prepared. This normal equation is obtained by performing learning for each of the classes beforehand. Next, based on information of a target class configuration comprised of arbitrary one or more features of the plural features, the normal equation for calculating the coefficient data etc. for each class in the target class configuration is generated.

Based on the information of the target class configuration, only the feature(s) included in the target class configuration may be considered to detect such a class in the basic class configuration as to have the same feature, thereby detecting the class in the basic class configuration that corresponds to each class in the target class configuration. Then, normal equations of the detected classes in the basic class configuration that correspond to each class in the target class configuration are added up for each class, thereby obtaining a normal equation for calculating coefficient data etc. for each class in the target class configuration.

Further, if n number of the features are included in the basic class configuration and each class in this basic class configuration is indicated by n-bit data whose each bit indicates the feature, n-bit mask bit pattern data whose a bit corresponding to any one of the features included in the target class configuration is set to "1" is generated. A logical product of the n-bit data representing each class in the basic class configuration and this mask bit pattern data is calculated for each bit. The classes having the same bit pattern as a calculation result in the basic class configuration are categorized into the same group, thereby detecting such the classes in the basic class configuration as to correspond to each class in the target class configuration.

Each of these generated normal equations for calculating coefficient data etc. for each class in the target class configuration is solved, thereby obtaining the coefficient data etc. for each class in the target class configuration.

In such a manner, according to the present invention, it is possible to efficiently generate the coefficient data etc. of each class in a target class configuration comprised of arbitrary one or more features of the plural features by performing the learning only once.

More specifically, by preparing a normal equation for calculating the coefficient data etc. for each class in a basic class configuration comprised of all of plural features, considering only the features included in the target class configuration, detecting such classes in the basic class configuration as to have the same feature, and adding up their normal equations to generate a normal equation for calculating the coefficient data etc. for each class in the target class configuration, coefficient data etc. for each class in an arbitrary class configuration are efficiently generated by performing the learning only once. Therefore, to alter the features included in a target class configuration, it is unnecessary to perform learning again, thereby enabling coefficient data to be easily generated in short time.

According to further aspect of the present invention, there provides a class configuration generation apparatus for selecting r number of features from n number of the features, both of n and r being integers, r<n, to obtain a class configuration which is used for generating, through class categorization, informational data of a target position in a second informational signal comprised of multiple items of informational data when converting a first informational signal comprised of multiple items of informational data into the second informational signal. The class configuration generation apparatus comprises a class configuration generation unit for generating (n−i) number of class configurations each of which is comprised of i (which is an integer) number of the already selected features plus a feature selected from the remaining (n−i) number of the features. The class configuration generation apparatus further comprises a class configuration selection unit for selecting an optimal class configuration from the (n−i) number of the class configurations generated by this class configuration generation unit, using an arbitrary evaluation value. In this class configuration generation apparatus, the features used in the class configuration selected by the class configuration selection unit are set as the already selected features, and operations by the class configuration generation unit and the class configuration selection unit are repeated with values for said i sequentially varying from 0 to r−1, thereby obtaining a class configuration comprised of the r number of the features.

According to still further aspect of the present invention, there provides a class configuration generation method for selecting r number of features from n number of the features, both of n and r being integers, r<n, to obtain a class configuration which is used for generating, through class categorization, informational data of a target position in a second informational signal comprised of multiple items of informational data when converting a first informational signal comprised of multiple items of informational data into the second informational signal. The method comprises a class configuration generation step of generating (n−i) number of class configurations each of which is comprised of already selected i (which is an integer) number of features plus a feature selected from the remaining (n−i) number of the features. The method also comprises a class configuration selection step of selecting an optimal class configuration from the (n−i) number of the class configurations generated by this class configuration generation step, using an arbitrary evaluation value. In this method, the features used in the class configuration selected by the class configuration selection step are set as the already selected features, and operations by the class configuration generation unit and the class configuration selection unit are repeated with values for said i sequentially varying from 0 to r−1, thereby obtaining a class configuration comprised of the r number of the features.

A program related to the present invention causes a computer to execute this class configuration generation method.

According to the present invention, a class configuration which is used for generating, through class categorization, informational data of a target position in a second informational signal comprised of multiple items of informational data when converting a first informational signal comprised of multiple items of informational data into the second informational signal is obtained by selecting r number of the features from n number of the features.

The feature(s) used in the selected class configuration is (are) set as the already selected features. An operation of generating (n−i) number of class configurations each of which is comprised of i number of the already selected features selected from remaining (n−i) number of the features and an operation of selecting an optimal class configuration from the (n−i) number of the class configurations using an arbitrary evaluation value are repeated with values for the sequentially varying from 0 to r−1, thereby enabling a class configuration comprised of the r number of the features to be obtained.

The informational data of a target position in the second informational signal is generated using coefficient data for an estimation equation that corresponds to a class to which the informational data of this target position belongs and based on this estimation equation. For example, an optimal class configuration is selected as follows.

That is, coefficient data for each class in (n−i) number of the generated class configurations, respectively, is generated. Next, for each class configuration, informational signal, which is made from an evaluating informational signal that corresponds to the second informational signal, corresponding to the first informational signal is converted to an informational signal corresponding to the second informational signal using the generated coefficient data. Next, for each class configuration, an evaluation value is calculated on the basis of a difference for each item of informational data between the informational signal thus obtained by the conversion and the evaluation informational signal. Then, based on the evaluation value of each of these class configurations, an optimal class configuration is selected.

In this case, when obtaining coefficient data for each class in the (n−i) number of the respective generated class configurations, using a coefficient generation apparatus or method for utilizing a normal equation for calculating the coefficient data etc. for each class in a basic class configuration comprised of all of plural features as described above allows the coefficient data etc. for each class in the (n−i) number of the respective generated class configurations to be obtained by performing learning one time only, thereby improving an efficiency of processing.

In such a manner, according to the present invention, an operation of generating (n−i) number of class configurations each of which is comprised of i number of the already selected features plus a feature selected from the remaining (n−i) number of the features and an operation of selecting an optimal class configuration from the (n−i) number of class configurations using an arbitrary evaluation value are repeated with the values for i sequentially varying from 0 to r−1 in which the features used in the selected class configuration are set as the already selected features, to obtain a class configuration comprised of the r number of the features, thereby enabling an optimal class configuration in short time without relying on human experiences.

According to additional aspect of the present invention, there provides an informational signal processing apparatus for converting a first informational signal comprised of multiple items of informational data into a second informational signal comprised of multiple items of informational data. The informational signal processing apparatus comprises a class detection unit for detecting, based on the first informational signal, a class in a predetermined class configuration to which informational data of a target position in the second informational signal belongs. The informational signal processing apparatus also comprises an informational data generation unit for generating the informational data of the target position in the second informational signal in accordance with the class detected by this class detection unit.

The predetermined class configuration is comprised of r (which is an integer) number of the features selected from n (which is an integer, r<n) number of the features. The r number of the features is obtained by repeating an operation of generating (n−i) number of class configurations each of which is comprised of i (which is an integer) number of the already selected features plus a feature selected from the remaining (n−i) number of the features, and an operation of selecting an optimal class configuration from the (n−i) number of the generated class configurations using an arbitrary evaluation value, with values for the i sequentially varying from 0 to r−1, in which the features used in the selected class configuration are set as the already selected features.

According to the present invention, a first informational signal comprised of multiple items of informational data is converted into a second informational signal comprised of multiple items of informational data. In this case, based on the first informational signal, a class in a predetermined class configuration to which informational data of a target position in the second informational signal belongs is detected, so that corresponding to this detected class, the informational data of the target position in the second informational signal is generated.

For example, the informational data of the target position in the second informational signal is generated as follows. That is, coefficient data, which is used in an estimation equation, corresponding to the detected class is generated. Based on the first informational signal, multiple items of informational data positioned in the periphery of a target position in the second informational signal are selected. Then, the generated coefficient data and multiple items of the selected informational data are used to calculate the informational data of the target position in the second informational signal based on the estimation equation.

It is to be noted that the predetermined class configuration is comprised of r number of the features selected from n number of the features, which r number of the features have been obtained as follows. That is, the r number of the features are obtained by repeating an operation of generating (n−i) number of class configurations each of which is comprised of i (which is an integer) number of the already selected features plus a feature selected from the remaining (n−i) number of the features and an operation of selecting an optimal class configuration from (n−i) number of the generated class configurations using an arbitrary evaluation value, with values for i sequentially varying from 0 to r−1, in which the features used in the selected class configuration are set as the already selected features.

In such a manner, according to the present invention, performing conversion processing accompanied by class categorization by use of an optimal class configuration comprised of r number of the features selected from n number of the features allows the first informational signal to be converted into the second informational signal, thereby obtaining the second informational signal well.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 3 is a diagram for showing a class tap;

FIG. 4 is a diagram for showing a dynamic-range DR class;

FIG. 10A is a diagram for showing one example of each class in the basic class configuration in processing of detecting a class in the basic class configuration that corresponds to each class in a target class configuration;

FIG. 10B is a diagram for showing one example of mask bit pattern data MBP in processing of detecting the class in the basic class configuration that corresponds to each class in the target class configuration;

FIG. 10C is a diagram for showing one example of a result of calculation of a logical product in processing of detecting the class in the basic class configuration that corresponds to each class in the target class configuration;

FIG. 11 is a flowchart for showing a procedure of processing for generating a target class configuration;

DESCRIPTION OF THE PREFERRED EMBODIMENTS

Figure 1:
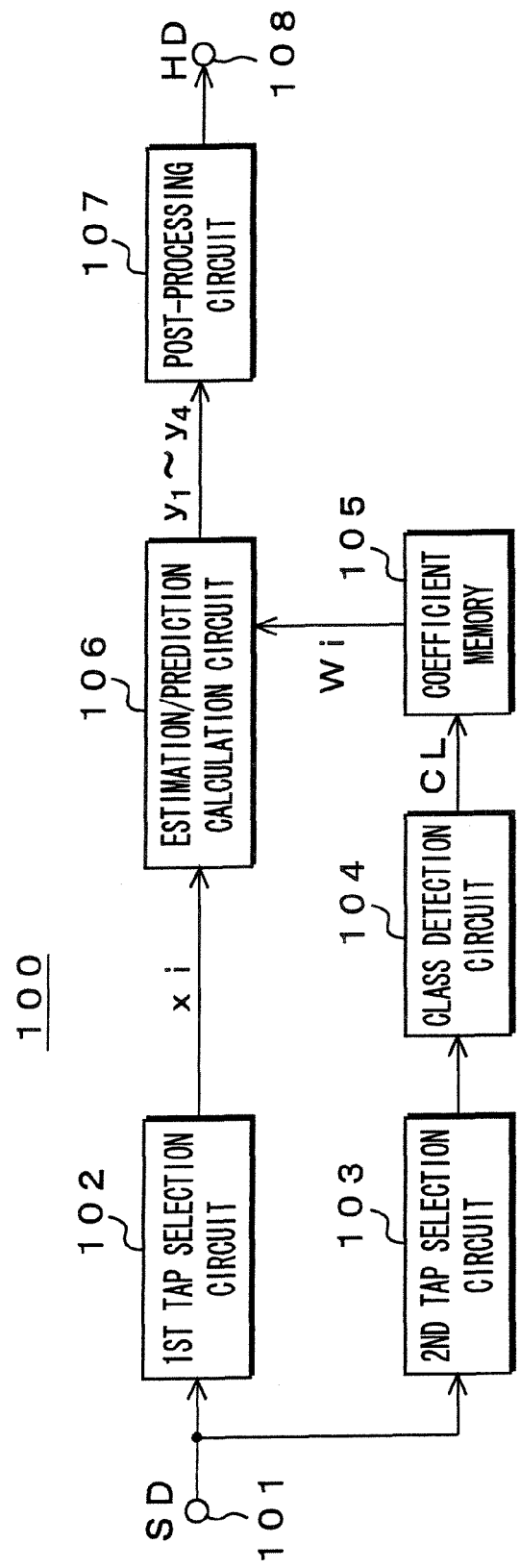
FIG. 1 is a block diagram for showing a configuration of an image signal processing apparatus.

The following will describe a first embodiment of the invention. FIG. 1 shows a configuration of an image signal processing apparatus 100 of informational signal processing apparatuses. The image signal processing apparatus 100 handles an image. This image signal processing apparatus 100 converts a standard definition (SD) signal referred to as a 525i signal into a high definition (HD) signal referred to as a 1050i signal.

Figure 2:
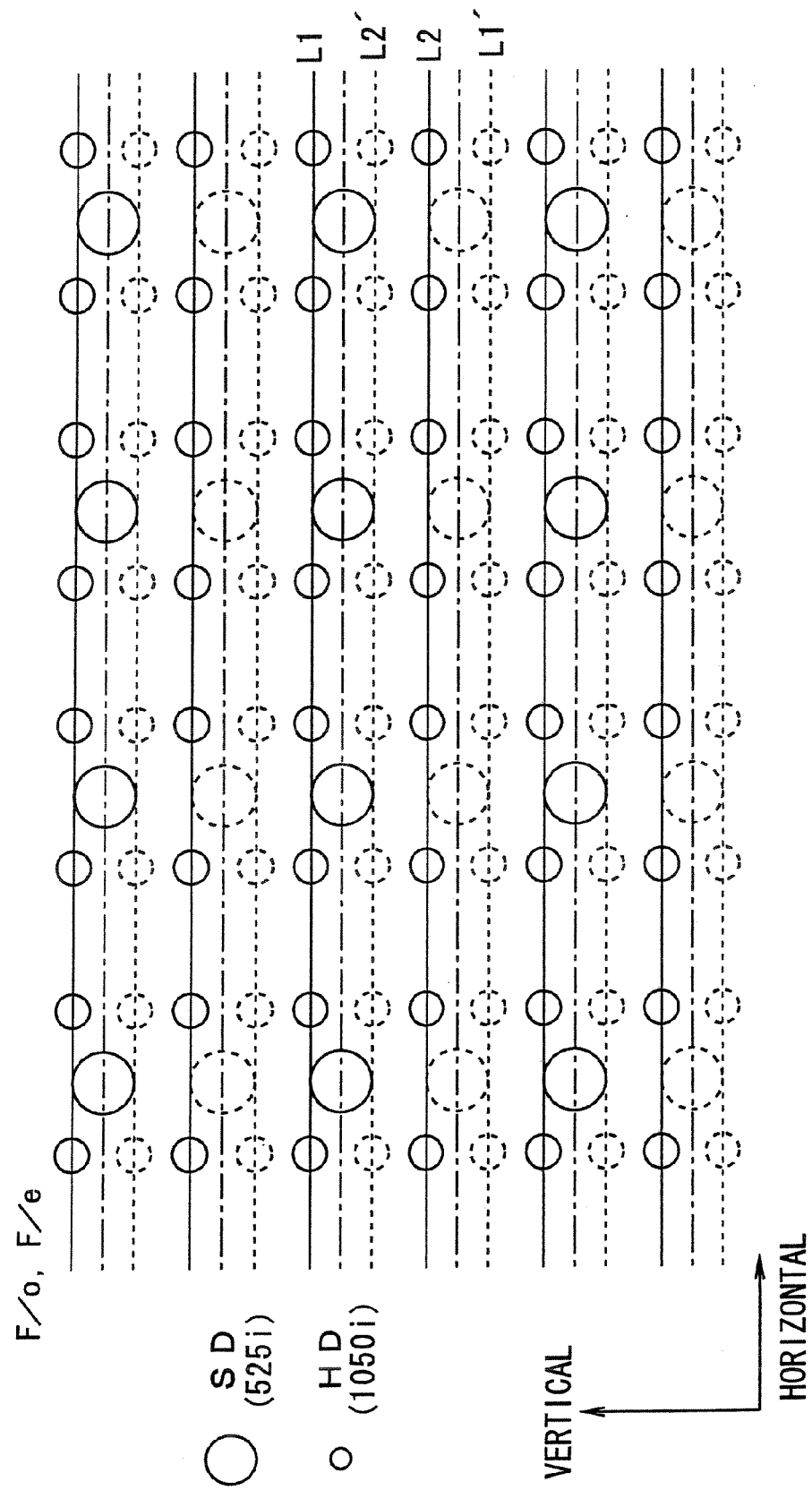
FIG. 2 is a diagram for showing a positional relationship in pixels between a 525i signal and a 1050i signal.

FIG. 2 shows a relationship between the 525i signal and the 1050i signal in terms of pixel position of a frame where these signals are present. In FIG. 2, Z the pixel position of an odd-numbered (o) field is indicated by a solid line and that of an even-numbered (e) field is indicated by a broken line. A large dot represents a pixel of the 525i signal and a small dot represents a pixel of the 1050i signal. As can be seen from FIG. 2, items of pixel data of the 1050i signal may come in items of line data L1 and L1' positioned near a line of the 525i signal and items of line data L2 and L2' positioned far away from the line of the 525i signal.

It is to be noted that L1 and L2 signify line data of an odd-numbered field and L1' and L2' signify line data of an even-numbered field. Further, the number of pixels of each line of the 1050i signal is twice that of the 525i signal.

As shown in FIG. 1, the image signal processing apparatus 100 comprises an input terminal 101 for receiving the SD signal and first and second tap selection circuits 102 and 103 each of which selectively takes out, based on the SD signal received by this input terminal, data of plural SD pixels positioned in the periphery of a target position in the HD signal and outputs the data.

The first tap selection circuit 102 selectively takes out data of plural SD pixels that is used in prediction (refereed to as "prediction taps"). The second tap selection circuit 103 selectively takes out data of plural SD pixels that is used in categorization of classes (referred to as "class taps").

Further, the image signal processing apparatus 100 comprises a class detection circuit 104 for detecting a class to which pixel data of a target position in the HD signal belongs, from the data of class taps taken out selectively by the second tap selection circuit 103.

In the present embodiment, as shown in FIG. 3, data of five SD pixels positioned in the periphery of a target position 30 in the HD signal is taken out as the data of class taps and used. In FIG. 3, "x" indicates each of the target positions 30 in the HD signal and "0" through "4" each indicate a tap position number. In this case, corresponding to the four target positions, the items of data of the five identical SD pixels are taken out as the data of class taps.

In the present embodiment, the class detection circuit 104 detects a class CL in a target class configuration comprised of, for example, six features that are selected from 12 features included in a basic class configuration.

The following will describe the 12 features included in the basic class configuration. Same of these 12 features are pixel-value features and the others are dynamic-range (DR) features.

Each pixel-value feature is composed of a 2-bit code obtained by compressing the items of data of the five SD pixels from 8-bit data into 2-bit data. This data compression is performed by, for example, adaptive dynamic range coding (ADRC). This data compression may be performed using any methods other than the ADRC, for example, DPCM (predictive coding), VQ (vector quantization), etc.

When employing ADRC, supposing that a maximum value of the items of data of the five SD pixels as class taps is MAX, its minimum value is MIN, its dynamic range is DR (=MAX−MIN+1), and its number of re-quantized bits is P, re-quantized code Qi of P number of bits as compressed data is obtained for each of the five items of SD pixel data ki (i=0-4) by calculation of the following Equation (1).

$$Qi=[(ki-\text{MIN}+0.5)\cdot 2^P/\text{DR}] \quad (1)$$

As described above, in the case of compression into 2-bit data, P=2, so that a 2-bit code Qi is obtained. A high-order bit M and a low-order bit L of a 2-bit code Qi (i=0-4) related to the items of data of the five SD pixels each provide a pixel-value feature.

A DR feature is composed of a 2-bit code (DR class) that indicates to which one of predetermined four regions each of the dynamic ranges DR of the items of data of the five SD pixels as class taps belongs as shown in FIG. 4. That is, when each of the dynamic ranges DR belongs to 0-31, 32-63, 64-127, and 128-255, the DR classes are "00", "01", "10", and "11", respectively. In this case, the high-order bit M and the lower-order bit L of each DR class each provide a DR feature.

Figure 5:
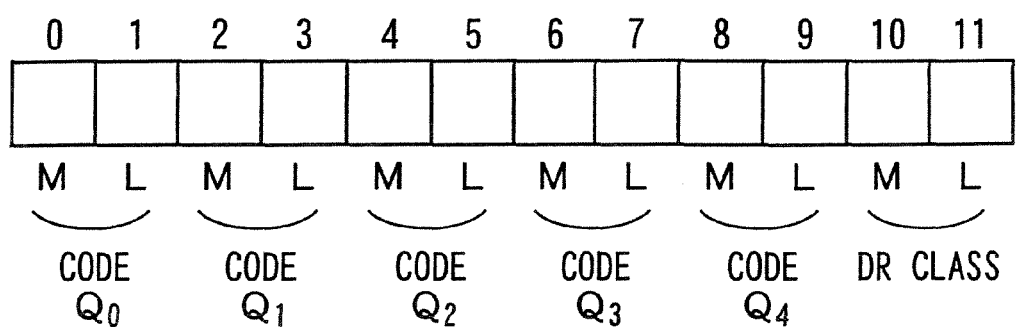
FIG. 5 is a diagram for showing bit pattern data of a basic class configuration.

FIG. 5 shows 12-bit bit pattern data obtained by interconnecting 2-bit codes Qi (i=0-4) each constituting the pixel-value feature and a DR class (2-bit code) constituting the DR feature. Each bit of the 12-bit bit pattern data corresponds to 12 features having numbers 0-11 relating to each feature included in the basic class configuration. This 12-bit bit pattern data indicates a class in the basic class configuration.

The class detection circuit 104 outputs a class CL that is present in a target class configuration comprised of one or more features, for example, six features selected from those ten pixel-value features and two DR features. That is, in this case, the class CL is 6-bit pattern data that corresponds to these selected six features. How to select the six features from the 12 features will be described later.

In FIG. 1, the pixel signal processing apparatus 100 comprises a coefficient memory 105. This coefficient memory 105 is used to store coefficient data Wi of each class in the above-mentioned target class configuration. The coefficient data Wi is used in an estimation equation that is used in a later-described estimation/prediction calculation circuit 106. This coefficient data Wi is information for converting an SD signal (525i signal) into an HD signal (1050i signal).

As described above, to convert the 525i signal into the 1050i signal, it is necessary to obtain four pixels of the 1050i signal for each pixel of the 525i signal in each of the odd-numbered and even-numbered fields. In this case, the four pixels in a unit pixel block of 2-times-2-unit that constitutes the 1050i signal m in each of the odd-numbered and even-numbered fields have different respective phase shifts with respect to a predicted center tap.

Figure 6:
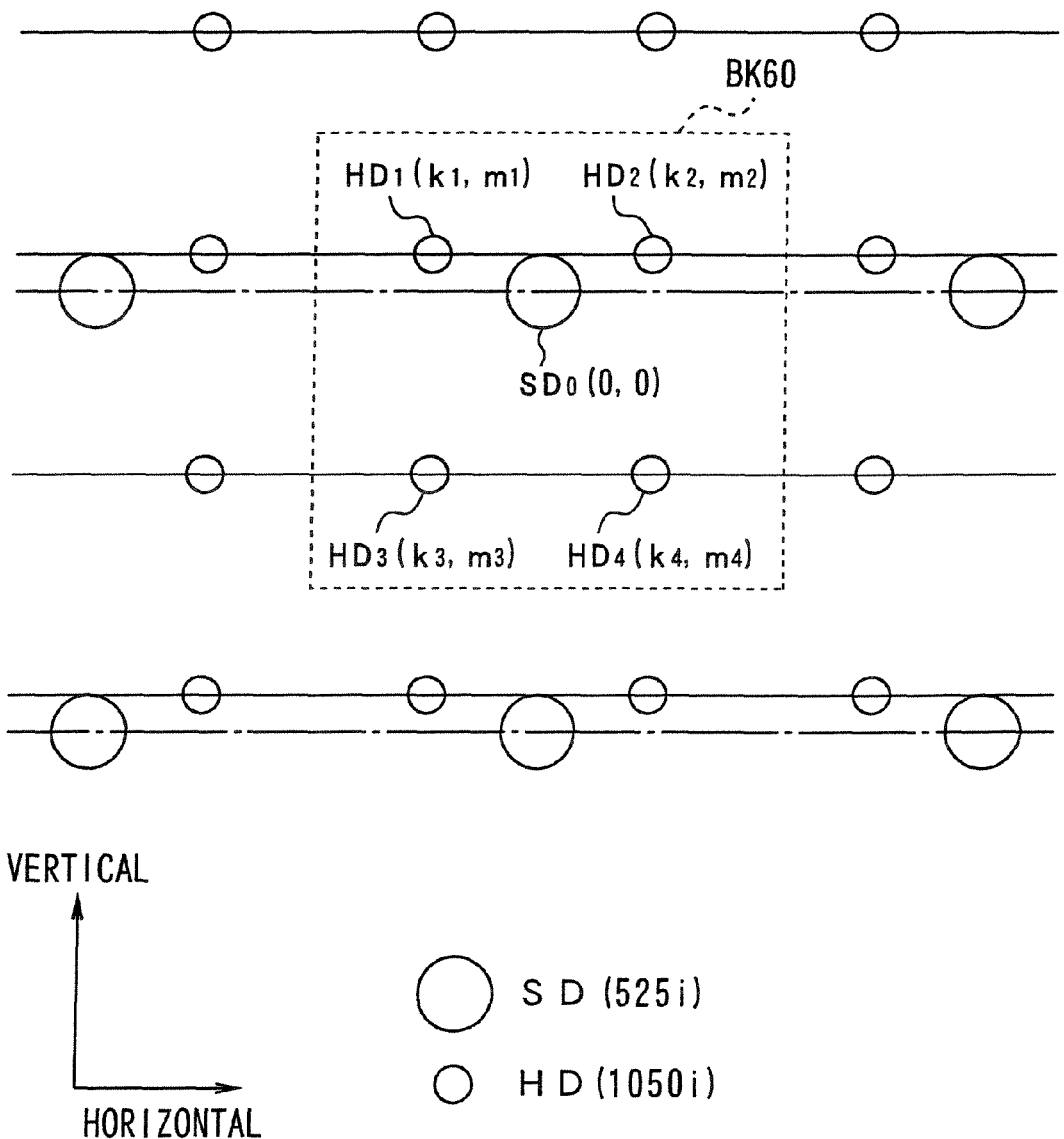
FIG. 6 is a diagram for showing a phase shift (in an odd-numbered field), with respect to a predicted center tap, of four pixels in a unit pixel block of an HD signal.

FIG. 6 shows each phase shift, with respect to a predicted center tap SD0, of four pixels HD1-HD4 in a unit pixel block BK60 of 2-times-2-unit that constitute the 1050i signal in an odd-numbered field. In it, positions of HD1-HD4 are shifted from a position of SD0 by k1-k4 horizontally and m1-m4 vertically, respectively.

Figure 7:
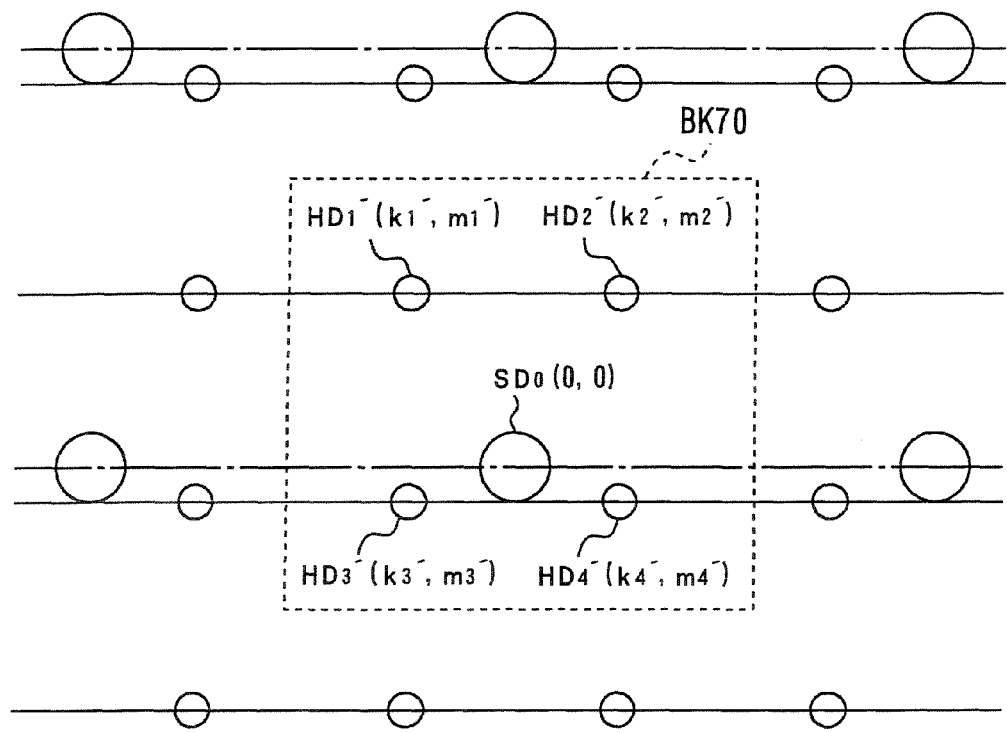
FIG. 7 is a diagram for showing phase shift (in an even-numbered field), with respect to a predicted center tap, of four pixels in a unit pixel block of an HD signal.

FIG. 7 shows each phase shift, with respect to a predicted center tap SD0', of four pixels HD1'-HD4' in a unit pixel block BK70 of 2-times-2-unit that constitute the 1050i signal in an even-numbered field. In it, positions of HD1'-HD4' are shifted from a position of SD0 by k1-k4' horizontally and m1'-4' vertically, respectively.

Therefore, the coefficient memory 105 stores the items of coefficient data Wi for each combination of a class and output pixels (HD1-HD4, HD1'-HD4'). How to generate the items of coefficient data Wi will be described later.

The coefficient memory 105 receives, as read address information, a class code CL from the above-mentioned class detection circuit 104. From this coefficient memory 105, the items of coefficient data Wi (i=1~n) for an estimation equation that correspond to the class code CL are read and supplied to the estimation/prediction calculation circuit 106. The estimation/prediction calculation circuit 106 calculates items of data y in HD pixels to be made using an estimation equation according to the following estimation equation (2) from the items of data xi for the prediction taps and the items of coefficient data Wi received from the coefficient memory 105.

$$y = \sum_{i=1}^{n} W_i \cdot x_i \qquad (2)$$

In the Equation (2), "n" indicates the number of prediction taps, which are selected by the first tap selection circuit 102.

Further, the image signal processing apparatus 100 comprises the estimation/prediction calculation circuit 106 for calculating the items of pixel data (pixel data of a target position) in an HD signal to be made, according to the estimation equation (2), from the items of data xi of the prediction taps selectively received from the first tap selection circuit 102 and the items of coefficient data Wi received from the coefficient memory 105.

As described above, to convert the SD signal into the HD signal, it is necessary to obtain four pixels (see $HD_1$-$HD_4$ in FIG. 6 and $HD_1'$-$HD_4'$ in FIG. 7) of the HD signal for each pixel of the SD signal. By this estimation/prediction calculation circuit 106, items of pixel data are generated for each pixel block unit of 2-times-2-unit that constitutes the HD signal.

That is, this estimation/prediction calculation circuit 106 receives the items of data xi of the prediction taps that correspond to four pixels (target pixel) in a unit pixel block from the first tap selection circuit 102 and the items of coefficient data Wi that correspond to the four pixels that constitute this unit pixel block from the coefficient memory 105, thereby calculating four items of pixel data $y_1$-$y_4$ that constitute the unit pixel block according to the above Equation (2) individually.

Further, the image signal processing apparatus 100 comprises a post-processing circuit 107 for receiving the items of pixel data $y_1$-$y_4$ of four pixels in a unit pixel block sequentially from the estimation/prediction calculation circuit 106. The post-processing circuit 107 linear-sequences the items of pixel data $y_1$-$y_4$ and outputs them in a format of the 1050i signal.

The following will describe operations of the image signal processing apparatus 100.

From an SD signal (525i signal) input to the input terminal 101, items of data of five SD pixels as class taps which are positioned in the periphery of four pixels (pixels of target position) in a unit pixel block that constitutes an HD signal (1050i signal) to be made are selectively taken out at the second tap selection circuit 103.

The data of the class tap selectively taken out at this second tap selection circuit 103 is supplied to the class detection circuit 104. The class detection circuit 104 obtains a 2-bit code Qi by performing ADRC processing on each of the items of the data of five SD pixels as class taps and also obtains a 2-bit code (DR class) from a dynamic range DR of the items of the data of five SD pixels as class taps.

Accordingly, the class detection circuit 104 obtains a 12-bit bit pattern data that corresponds to 12 features. In the bit pattern data, each of the 12 bits represents each of the numbers 0-11 relative to the features. Therefore, at the class detection circuit 104, from this 12-bit bit pattern data, such bits as to respectively correspond to six features included in a target class configuration are taken out, thereby obtaining 6-bit bit pattern data as a class CL in the target class configuration. This class CL is supplied as read address information to the coefficient memory 105.

It is to be noted that not all of the 2-bit codes Qi (i=0-4) and the DR classes but only some of them that correspond to the features in a target class configuration may be obtained at the class detection circuit 104.

When the coefficient memory 105 receives a class CL as read address information, from this coefficient memory 105 correspondingly, items of the coefficient data Wi of such estimation equations as to accommodate four output pixels (HD1-HD4 in an odd-numbered field, HD1'-HD4' in an even-numbered field) that correspond to the class code CL are read and supplied to the estimation/prediction calculation circuit 106.

Further, from the SD signal input to the input terminal 101, the items of data (SD pixel data) xi of the prediction taps, which are positioned in the periphery of four pixels (pixels of a target position) in a unit pixel block that constitutes an HD signal to be made, are selectively taken out from the first tap selection circuit 102.

The estimation/prediction calculation circuit 106 calculates the items of pixel data $y_1 \sim y_4$ of the four pixels (pixels of the target position) in the unit pixel block that constitutes the HD signal to be made, using the items of data xi of the prediction taps and the items of coefficient data Wi for the four output pixels received from the coefficient memory 105 (see Equation (2)). Then, the items of pixel data $y_1 \sim y_4$ of the four pixels in the unit pixel block that constitutes the HD signal sequentially output from this estimation/prediction calculation circuit 106 are supplied to the post-processing circuit 107.

This post-processing circuit 107 linear-sequences the items of the pixel data $y_1 \sim y_4$ of the four pixels in the unit pixel block sequentially supplied from the estimation/prediction calculation circuit 106 and outputs them in the format of the 1050i signal. That is, from the post-processing circuit 107, the 1050i signal as the HD signal is output and derived to an output terminal 108.

The following will describe how to generate the items of coefficient data Wi (i=1~n), to be stored in the coefficient memory 105, of each class in a target class configuration.

First, a normal equation is prepared for calculating coefficient data for each class in a basic class configuration comprised of all of 12 features. This normal equation is obtained by performing learning beforehand.

A learning method will be described as follows. Before learning, items of the coefficient data $W_1, W_2, \ldots, W_n$ are undetermined in the above-mentioned Equation (2). Learning is performed on multiple items of signal data for each class. If the number of items of the learning data is m, the following equation (3) is set in accordance with Equation (2).

$$Y_k = W_1 \times x_{k1} + W_2 \times x_{k2} + \ldots + W_n \times x_{kn} \quad (3)$$

(k=1,2, . . . , m)

Wherein, "n" indicates the number of prediction taps.

If m>n, none of the items of coefficient data $W_1, W_2, \ldots, W_n$ can be determined uniquely, so that an element $e_k$ of an error vector e is defined by the following equation (4) to obtain coefficient data that minimizes $e^2$ in Equation (5). That is, the coefficient data is obtained uniquely by using the so-called least-squares method.

$$e_k = y_k - \{W_1 \times x_{k1} + W_2 \times x_{k2} + \cdots + W_n \times x_{kn}\} (k = 1, 2, \ldots m) \quad (4)$$

-continued $$e^2 = \sum_{k=1}^{m} e_k^2 \quad (5)$$

By an actual calculation method for obtaining the coefficient data that minimizes $e^2$ in Equation (5), first, as shown in Equation (6), $e^2$ is partially differentiated with respect to the items of coefficient data Wi (i=1~n) to obtain the items of coefficient data Wi such that a partially differentiated value for each of the "i" values may be 0.

$$\frac{\partial e^2}{\partial Wi} = \sum_{k=1}^{m} 2\left(\frac{\partial e_k}{\partial Wi}\right) e_k \quad (6)$$

$$= \sum_{k=1}^{m} 2x_{ki} \cdot e_k$$

If Xji and Yi are defined as indicated in the following Equations (7) and (8), Equation (6) can be written in a form of determinant of Equation (9). This equation (9) is a normal equation for calculating the coefficient data. By solving this normal equation using a general solution such as a sweeping-out method (e.g., Gauss-Jordan's elimination method), the items of coefficient data Wi (i=1~n) can be calculated.

$$X_{ji} = \sum_{p=1}^{m} x_{pi} \cdot x_{pj} \quad (7)$$

$$Y_i = \sum_{k=1}^{m} x_{ki} \cdot y_k \quad (8)$$

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{n1} & X_{n2} & \cdots & X_{nn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_n \end{bmatrix} \quad (9)$$

By considering only six features included in a target class configuration of 12 features included in a basic class configuration, normal equations for each class in the basic class configuration having the same as those are added up, thereby g generating a normal equation for calculating the coefficient data for each class in the target class configuration.

In this case, the number of the classes in the basic class configuration is $2^{12}=4096$, so that the number of the normal equations for calculating the coefficient data for each class in the basic class configuration is 4096. On the other hand, the number of the classes in the target class configuration, which includes the six features, is $2^6=64$, so that the number of the normal equations for calculating the coefficient data of each class in the target class configuration is 64.

When only the six features included in the target class configuration are considered, the number of the classes in the basic class configuration that have the same as those is 64. That is, a normal equation for calculating coefficient data for each class in the target class configuration is generated by adding up the normal equations of the 64 classes in the basic class configuration. If the 64 normal equations are given as the following Equations (10-1) through (10-64), they are added up to give such a normal equation as shown in the following Equation (11).

$$\begin{bmatrix} X_{11-1} & X_{12-1} & \cdots & X_{1n-1} \\ X_{21-1} & X_{22-1} & \cdots & X_{2n-1} \\ \cdots & \cdots & \cdots & \cdots \\ X_{n1-1} & X_{n2-1} & \cdots & X_{nn-1} \end{bmatrix} \begin{bmatrix} W_{1-1} \\ W_{2-1} \\ \cdots \\ W_{n-1} \end{bmatrix} = \begin{bmatrix} Y_{1-1} \\ Y_{2-1} \\ \cdots \\ Y_{n-1} \end{bmatrix} \quad (10_{-1})$$

$$\begin{bmatrix} X_{11-2} & X_{12-2} & \cdots & X_{1n-2} \\ X_{21-2} & X_{22-2} & \cdots & X_{2n-2} \\ \cdots & \cdots & \cdots & \cdots \\ X_{n1-2} & X_{n2-2} & \cdots & X_{nn-2} \end{bmatrix} \begin{bmatrix} W_{1-2} \\ W_{2-2} \\ \cdots \\ W_{n-2} \end{bmatrix} = \begin{bmatrix} Y_{1-2} \\ Y_{2-2} \\ \cdots \\ Y_{n-2} \end{bmatrix} \quad (10_{-2})$$

$$\vdots$$

$$\begin{bmatrix} X_{11-64} & X_{12-64} & \cdots & X_{1n-64} \\ X_{21-64} & X_{22-64} & \cdots & X_{2n-64} \\ \cdots & \cdots & \cdots & \cdots \\ X_{n1-64} & X_{n2-64} & \cdots & X_{nn-64} \end{bmatrix} \begin{bmatrix} W_{1-64} \\ W_{2-64} \\ \cdots \\ W_{n-64} \end{bmatrix} = \begin{bmatrix} Y_{1-2} \\ Y_{2-2} \\ \cdots \\ Y_{n-64} \end{bmatrix} \quad (10_{-64})$$

$$\begin{bmatrix} (X_{11-1} + X_{11-2} + \cdots + X_{11-64}) & (X_{12-1} + X_{12-2} + \cdots + X_{12-64}) & \cdots & (X_{1n-1} + X_{1n-2} + \cdots + X_{1n-64}) \\ (X_{21-1} + X_{21-2} + \cdots + X_{21-64}) & (X_{22-1} + X_{22-2} + \cdots + X_{22-64}) & \cdots & (X_{2n-1} + X_{2n-2} + \cdots + X_{2n-64}) \\ \cdots & \cdots & \cdots & \cdots \\ (X_{n1-1} + X_{n1-2} + \cdots + X_{n1-64}) & (X_{n2-1} + X_{n2-2} + \cdots + X_{n2-64}) & \cdots & (X_{nn-1} + X_{nn-2} + \cdots + X_{nn-64}) \end{bmatrix} \quad (11)$$

$$\begin{bmatrix} (W_{1-1} + W_{1-2} + \cdots + W_{1-64}) \\ (W_{2-1} + W_{2-2} + \cdots + W_{2-64}) \\ \cdots \\ (W_{n-1} + W_{n-2} + \cdots + W_{n-64}) \end{bmatrix} = \begin{bmatrix} (Y_{1-1} + Y_{1-2} + \cdots + Y_{1-64}) \\ (Y_{2-1} + Y_{2-2} + \cdots + Y_{2-64}) \\ \cdots \\ (Y_{n-1} + Y_{n-2} + \cdots + Y_{n-64}) \end{bmatrix}$$

Next, the normal equations thus generated for calculating the items of coefficient data for each class in the target class configuration are solved to give the coefficient data for each class in the basic class configuration. In this case, these normal equations are solved by a general solution such as the sweeping-out method.

Figure 8:
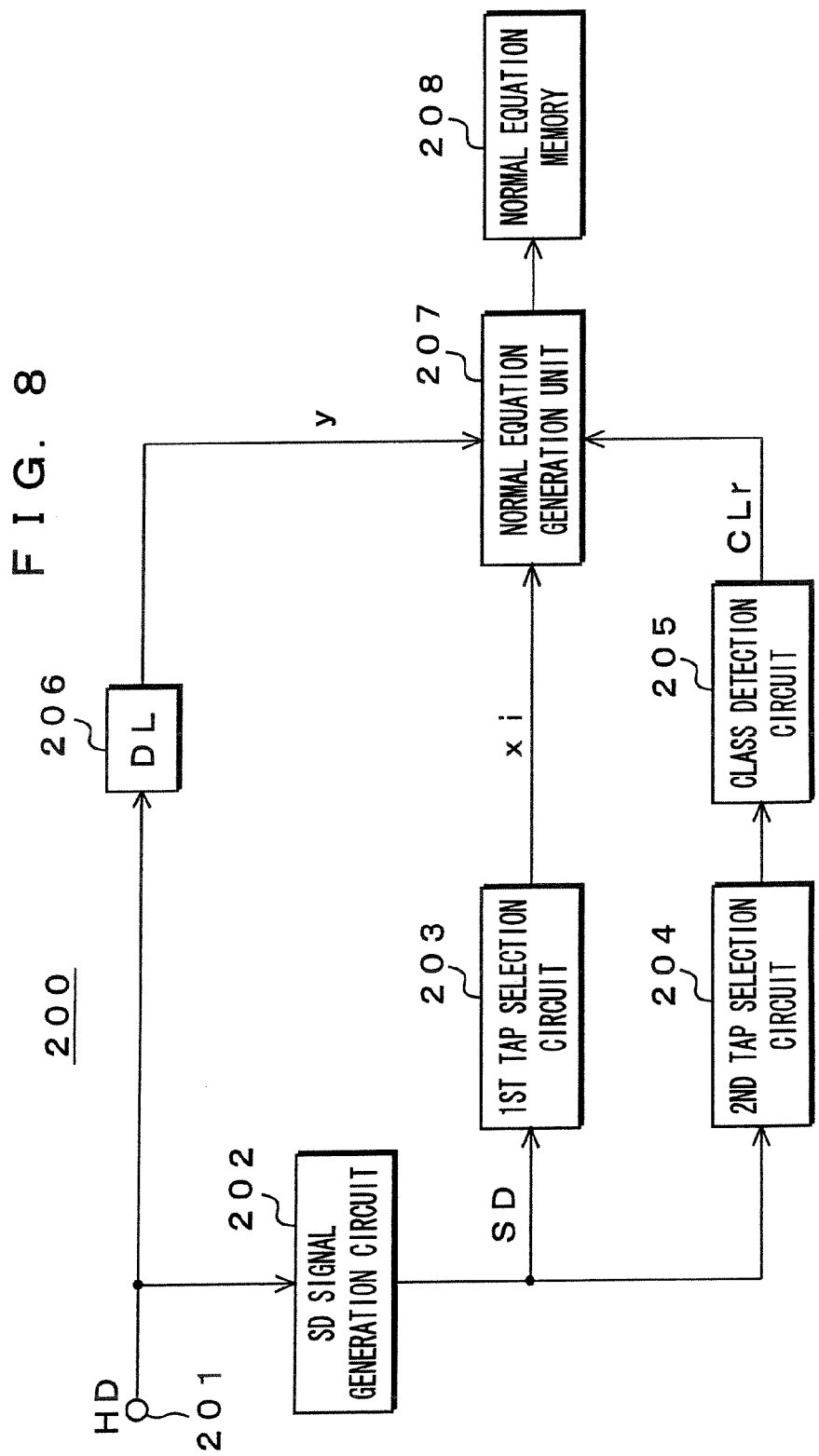
FIG. 8 is a block diagram for showing a configuration of a normal equation generation apparatus.

FIG. 8 shows a configuration of a normal equation generation apparatus 200 for generating a normal equation for calculating coefficient data for each class ID in a basic class configuration that is comprised of all of 12 features.

This normal equation generating apparatus 200 comprises an input terminal 201 to which an HD signal as a tutor signal is input and an SD signal generation circuit 202 for performing thinning-out processing on this HD signal horizontally and vertically to thereby obtain an SD signal as a student signal.

The normal equation generation apparatus 200 also comprises first and second tap selection circuits 203 and 204 each selectively taking out, based on the SD signal received from the SD signal generation circuit 202, multiple items of data for SD pixels positioned in the periphery of a target position in the HD signal and outputs them.

These first and second tap selection circuits 203 and 204 are constituted according to the same way as the first and second tap selection circuits 102 and 103 of the above-mentioned image signal processing apparatus 100 shown in FIG. 1. That is, the first tap selection circuit 203 selectively takes out multiple items of data for SD pixels that are used in prediction (refereed to as "prediction taps"). The second tap selection circuit 204 selectively takes out multiple items of data for SD pixels that are used in categorization of classes (referred to as "class taps").

The normal equation generation apparatus 200 further comprises a class detection circuit 205 for detecting a class to which pixel data of a target position in the HD signal belongs, from the items of data of class taps taken out selectively by the second tap selection circuit 204. This class detection circuit 205 is constituted according to roughly the same way as the class detection circuit 104 of the above-mentioned image signal processing apparatus 100 shown in FIG. 1.

In contrast to the class detection circuit 104 which detects a class CL in a target class configuration comprised of, for example, six features, which are selected from 12 features of which a basic class configuration is comprised, this class detection circuit 205 detects a class CLr in the basic class configuration.

That is, the class detection circuit 205 employs, for example, ADRC to compress each of the items of data for five SD pixels as class taps from an 8-bit data format into a 2-bit data format, thereby obtaining a 2-bitcode Qi (i=0-4) that compose the pixel-value feature. Further, the class detection circuit 205 obtains a 2-bit code (DR class) according to which one of predetermined four regions a dynamic range DR of each of the items of data for the five SD pixels as class taps belongs (see FIG. 4).

The class detection circuit 205 obtains 12-bit bit pattern data which is given by interconnecting a 2-bit code Qi (i=0-4) constituting a pixel value feature and a DR class (2-bit code) constituting a DR feature (see FIG. 5) and outputs this 12-bit bit pattern data as a class CLr.

Further, the normal equation generation apparatus 200 further comprises a delay circuit 206 for time-adjusting an HD signal input to the input terminal 201 and a normal equation generation unit 207. The normal equation generation unit 207 generates a normal equation (see Equation (9)) for obtaining the items of coefficient data Wi (i=1~n) for each class from each of the items of HD pixel data y as target pixel data obtained from the HD signal time-adjusted by the delay circuit 206, n number of items of the SD pixel data xi as data of prediction taps selectively taken out from the first tap selection circuit 203 corresponding to each of these items of HD pixel data y, and a class CLr output from the class detection circuit 205 corresponding to each of the items of HD pixel data y.

In this case, one item of HD pixel data y and the corresponding prediction tap data xi are combined to generate learning data, which is actually generated much for each class between an HD signal as a tutor signal and an SD signal as the student signal. Accordingly, at the normal equation generation unit 207, a normal equation for generating the items of coefficient data Wi (i=1~n) is generated for each class.

In this case, further, at the normal equation generation unit 207, a normal equation is generated for each output pixel (see HD1-HD4 of FIG. 6, HD1'-HD4' of FIG. 7). For example, a normal equation that corresponds to HD1 is generated from learning data, which is composed of HD pixel data y whose value of a shift with respect to a predicted center tap is in the same relationship as that of HD1. As a result, at the normal equation generation unit 207, a normal equation is generated for each combination of a class and an output pixel position.

The normal equation generation apparatus 200 still further comprises a normal equation memory 208 for storing data of the normal equation generated by the normal equation generation unit 207. A normal equation for calculating the items of coefficient data Wi (i=1~n) for each class in a basic class configuration stored in this normal equation memory 208 is used to generate the items of coefficient data Wi (i=1~n) for each class in a target class configuration.

The following will describe operations of the normal equation generation apparatus 200 shown in FIG. 8.

An HD signal (1050i signal) as a tutor signal is input to the input terminal 201. On this HD signal, the SD signal generation circuit 202 performs thinning-out processing horizontally and vertically, thereby generating an SD signal (525i signal) as a student signal.

From this SD signal obtained from the SD signal generation circuit 202, the second tap selection circuit 204 selectively takes out the items of data for five SD pixels as class taps positioned in the periphery of a target position in the HD signal.

The items of data of the class taps selectively taken out from this second tap selection circuit 204 are supplied to the class detection circuit 205. At the class detection circuit 205, a 2-bit code Qi is obtained by performing ADRC processing on each of the item of data for five SD pixels as the class taps, a 2-bit code (DR class) is obtained from a dynamic range DR of each of the items of data for the five SD pixels as the class taps, and 12-bit pattern data is obtained as a class CLr by connecting these to each other.

Further, the first tap selection circuit 203 selectively takes out item of data xi of the prediction taps positioned in the periphery of a target position in the HD signal from the SD signal obtained at the SD signal generation circuit 202.

The normal equation generation unit 207 individually generates normal equations (see Equation (9)) each for obtaining the items of coefficient data Wi (i=1~n) for each coordination of a class and an output pixel position, using items of HD pixel data y of each target position obtained from the HD signal time-adjusted by the delay circuit 206, the items of data xi of a prediction tap selectively taken out from the first tap selection circuit 203 corresponding to items of the HD pixel data y of each of the target positions, and a class CLr obtained at the class detection circuit 205 corresponding to the items of HD pixel data y of each of the target positions. Data of this normal equation is stored in the normal equation memory 208.

Figure 9:
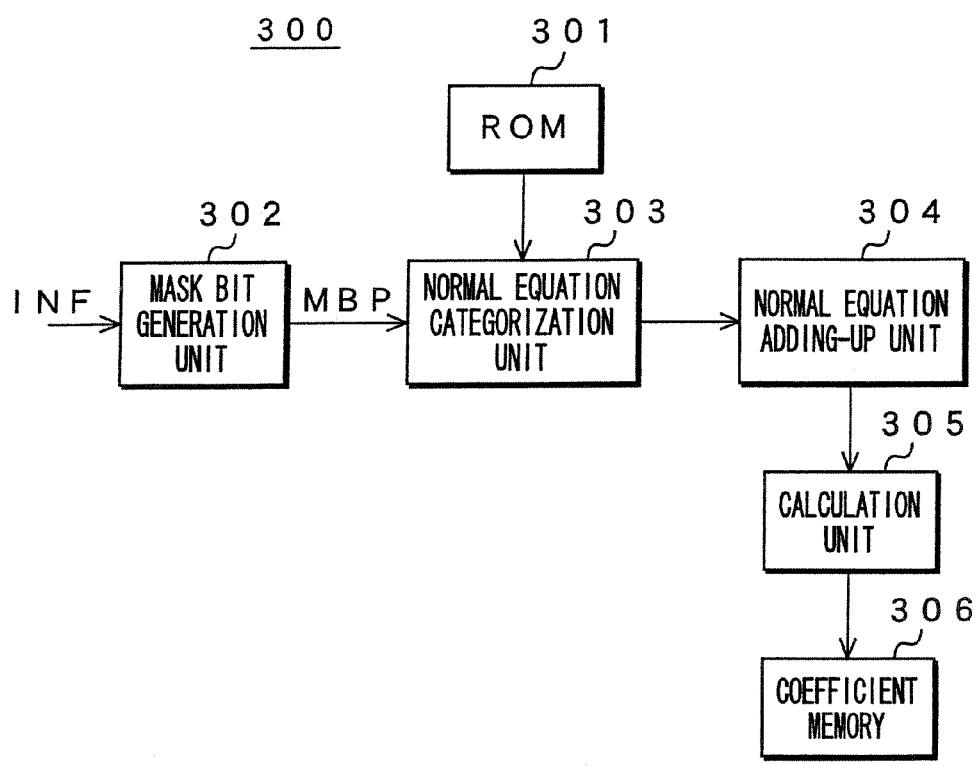
FIG. 9 is a block diagram for showing a configuration of coefficient generation apparatus.

FIG. 9 shows a configuration of a coefficient generation apparatus 300 for generating items of the coefficient data Wi (i=1~n) for each class in a target class configuration. The coefficient data Wi is to be stored in the coefficient memory 105 of the image signal processing apparatus 100 of FIG. 1.

This coefficient generation apparatus 300 comprises a read only memory (ROM) 301 as a storage unit for storing the items of data of a normal equation for calculating coefficient data for each class in a basic class configuration. The items of data of this normal equation have been generated by, for example, the above-mentioned normal equation generation apparatus 200 of FIG. 8.

Further, the coefficient generation apparatus 300 also comprises a mask bit generation unit 302 for generating mask bit pattern data MBP based on information INF of a target class configuration. It is to be noted that the information INF indicates one-to-one correspondence between, for example, six features included in a target class configuration and 12 features included in a basic class configuration.

The mask bit generation unit 302 generates 12-bit mask bit pattern data MBP in which a bit corresponding to any features included in the target class configuration is set to "1". FIG. 10B shows data MBP in a case where, for example, a target class configuration includes two features and these two features indicate a low-order bit L of a 2-bit code $Q_2$ and a low-order bit L of a DR class, respectively (see FIG. 5).

Further, the coefficient generation apparatus 300 also comprises a normal equation categorization unit 303 for categorizing normal equations each for calculating coefficient data for each class in the basic class configuration stored in the ROM 301 into those that correspond to each class in the target class configuration.

In this case, the normal equation categorization unit 303 considers only the features included in the target class configuration and detects such classes in the basic class configuration as to have the same as those included in the target class configuration, to detect each class in the basic class configuration that correspond to each class in the target class configuration, thereby categorizing normal equations for each class in the basic class configuration into those that correspond to each class in the target class configuration.

To detect each class in the basic class configuration that correspond to each class in the target class configuration, the normal equation categorization unit 303 uses the above-mentioned mask bit pattern data MBP. It is to be noted that the mask bit generation unit 302 and the normal equation categorization unit 303 are combined to constitute a class detection unit.

In this case, a logical product of each bit of the 12-bit data that represents each class (as many as 4096) for the basic class configuration shown in FIG. 10A and each bit of the 12-bit mask bit pattern data MBP is calculated. Each class for the basic class configuration that have the same bit pattern of a calculation result is then categorized into the same group, thereby detecting each class in the basic class configuration as to correspond to each class in the target class configuration.

For example, if the mask bit pattern MBP is such as shown in FIG. 10B, a result of calculation of the logical product will be such as shown in FIG. 10C. In this case, as a result of these calculations, four bit patterns are obtained such as "100000000000", "100000000001", "000001000000", and "000001000001". Those classes in the basic class configuration that correspond to each of these four bit patterns are categorized into the same group, so that these groups correspond respectively to the four classes in the target class configuration, that is, "00", "01", "10", and "11".

Although FIG. 10 shows a case where the target class configuration includes two features. The target class configuration may include, for example, six features, in which case 64 bit patterns are obtained as a result of calculation. In this case, such classes in the basic class configuration as to correspond to each of these 64 bit patterns are categorized into the same group. Each of these groups of the classes in the basic class configuration corresponds to each of the 64 classes in the target class configuration.

The coefficient generation apparatus 300 further a normal equation adding-up unit 304 for adding up, for each category, normal equations for calculating the items of coefficient data for each class in a basic class configuration, which have been categorized by the normal equation categorization unit 303 so as to correspond to each class in a target class configuration, thereby generating a normal equation for calculating the items of coefficient data for each class in the target class configuration. It is to be noted that the above-mentioned class detection unit constituted of the mask bit generation unit 302 and the normal equation categorization unit 303 is combined with the normal equation adding-up unit 304 to constitute the normal equation generation unit.

In this case, if the target class configuration includes six features, normal equations that correspond to each of the 64 classes are generated. A normal equation of each class is generated by adding up the normal equations for calculating the item of coefficient data of 64 classes in the basic class configuration (see Equations (10-1) through (10-64) and (11)).

It is to be noted that in this case, the normal equation adding-up unit 304 adds up normal equations for each of the output pixels (see HD1-HD4 of FIG. 6, HD1'-HD4' of FIG. 7). Therefore, at the normal equation adding-up unit 304, normal equations for calculating the items of coefficient data for each class in a target class configuration are generated for each combination of the class and output pixel position.

Further, the coefficient generation apparatus 300 still further comprises a calculation unit 305 for receiving the items of data for normal equations generated by the normal equation adding-up unit 304 for each combination of the class and the output pixel position and solving these normal equations to obtain the items of coefficient data Wi for each combination of the class and the output pixel position. The coefficient generation apparatus 300 further comprises a coefficient memory 306 for storing the items of coefficient data Wi obtained by this calculation unit 305. The calculation unit 305 solves the normal equations using, for example, the sweeping-out method, thereby obtaining the items of coefficient data Wi.

The following will describe operations of the coefficient generation apparatus 300 shown in FIG. 9.

Information INF of a target class configuration is supplied to the mask bit generation unit 302. The mask bit generation unit 302 generates 12-bit mask bit pattern data MBP in which a bit corresponding to a feature included in the target class configuration is set to "1". This data MBP is supplied to the normal equation categorization unit 303.

The normal equation categorization unit 303 categorizes normal equations each for calculating the coefficient data for each class in a basic class configuration stored in ROM 301 into those that correspond to each class in the target class configuration.

For this categorization, the normal equation categorization unit 303 considers only the feature included in the target class configuration and detects such classes in the basic class configuration as to have the same as those to thereby detect the classes in the basic class configuration that correspond to each of the classes in the target class configuration.

In this case, a logical product of each bit of the 12-bit data that represents each class (as many as 4096) of the basic class configuration and each bit of the 12-bit mask bit pattern data MBP is calculated, so that the classes in the basic class configuration that have the same bit pattern of a calculation result are categorized into the sane group, thereby detecting such classes in the basic class configuration as to correspond to each of the classes in the target class configuration.

The normal equation adding-up unit 304 adds up, for each category, normal equations each for calculating the items of coefficient data of each class in a basic class configuration which have been categorized by the normal equation categorization unit 303 so as to correspond to each class in a target class configuration, thereby generating a normal equation for calculating the items of coefficient data of each class in the target class configuration. It is to be noted that data of the normal equations for calculating each class in the basic class configuration is read from the ROM301 and supplied through the normal equation categorization unit 303 to the normal equation adding-up unit 304.

Further, in this case, for each of the output pixels (HD1-HD4 of FIG. 6, HD1'-HD4' of FIG. 7), the normal equations are added up. Therefore, at the normal equation adding-up unit 304, normal equations for calculating the items of coefficient data of each class in a target class configuration are generated for each combination of the class and output pixel position.

Items of data of the normal equations generated by the normal equation adding-up unit 304 for each combination of the class and the output pixel position are supplied to the calculation unit 305. The calculation unit 305 solves these normal equations to obtain the items of coefficient data Wi for each combination of the class and the output pixel position. The items of coefficient data Wi are stored in the coefficient memory 306.

In such a manner, it is possible in the coefficient generation apparatus 300 shown in FIG. 9 to generate the items of coefficient data Wi to be used in an estimation equation for each combination of a class and an output pixel position (HD1-HD4, HD1'-HD4'), which are stored in the coefficient memory 105 of the image signal processing apparatus 100 of FIG. 1.

In this case, by storing the normal equations for calculating the items of coefficient data for each class in a basic class configuration including 12 features in the ROM 301 beforehand, and considering only a feature included in a target class configuration and adding up the normal equations of such classes in the basic class configuration as to have the same as those to thereby generate normal equations each for calculating the items of coefficient data for each class in the target class configuration and solving this normal equation, it is possible to efficiently generate the items of coefficient data for each class in the target class configuration, thereby generating the items of coefficient data for each class in an arbitrary class configuration by performing learning only once. Therefore, when altering the features included in a target class configuration, it is not necessary to perform learning again, thereby enabling the coefficient data to be easily generated in short time.

As described above, in the image signal processing apparatus 100 shown in FIG. 1, for example, six features are selected from the 12 features, so that classes in a target class configuration including these selected six features are categorized.

The following will describe processing for selecting r (which is an integer) number of the features from n (which is an integer, r<n) number of the features and generating a target class configuration that includes the r number of the features.

A flowchart of FIG. 11 shows a procedure for the processing.

At step ST1, "i" is set to 0. At step ST2, in addition to i (which is an integer) number of the features that have already selected, one of the remaining (n−i) number of the features is selected. Thus, (n−i) number of class configurations each including (i+1) number of the features are made.

At step ST3, an arbitrary evaluation value is used to select an optimal class configuration of the (n−i) number of class configurations. For example, this optimal class configuration is selected by the following processing.

First, coefficient data of each class in each of the (n−i) number of class configurations is generated. This data is generated using, for example, the above-mentioned coefficient generation apparatus 300 shown in FIG. 9.

Next, the generated coefficient data of each class is used for each class configuration, to convert an image signal that corresponds to an SD signal into an image signal that corresponds to an HD signal using the above-mentioned image signal processing apparatus 100 shown in FIG. 1. It is to be noted that the image signal that corresponds to the SD signal is supposed to have been generated by performing thinning-out processing horizontally and vertically on an evaluating image signal that corresponds to the HD signal.

Next, for each class configuration, an evaluation value is obtained on the basis of a difference for each item of pixel data between the converted image signal and the evaluating image signal. The following Equation (12) gives a signal to noise ratio (SNR) as one example of the evaluation value.

$$SNR = 20\log_{10}\left(\frac{255}{\sqrt{\frac{\sum_{i=1}^{N}(yi-Yi)^2}{N}}}\right) \quad (12)$$

In Equation (12), yi indicates an i'th item of the pixel data in the converted image signal, Yi indicates an i'th item of the pixel data in the evaluating image signal, and N indicates the number of pixels.

Next, an optimal class configuration is selected on the basis of the evaluation values of the class configurations. If the evaluation value is an SNR given by Equation (12), such a class configuration that this SNR is maximized is selected as the optimal class configuration.

In FIG. 11, after processing at step ST3, features, which have been used in the selected class configuration, are used as the already selected features at step ST4 and, at step ST5, "i" is increased by 1 (one). At step ST6, it is decided whether i=r. If i=r, it means that r number of the features included in the target class configuration have been selected already, so that the processing ends. If "i" is not equal to r, on the other hand, the process returns to step ST2 to repeat the same processing as described above.

Figure 12:
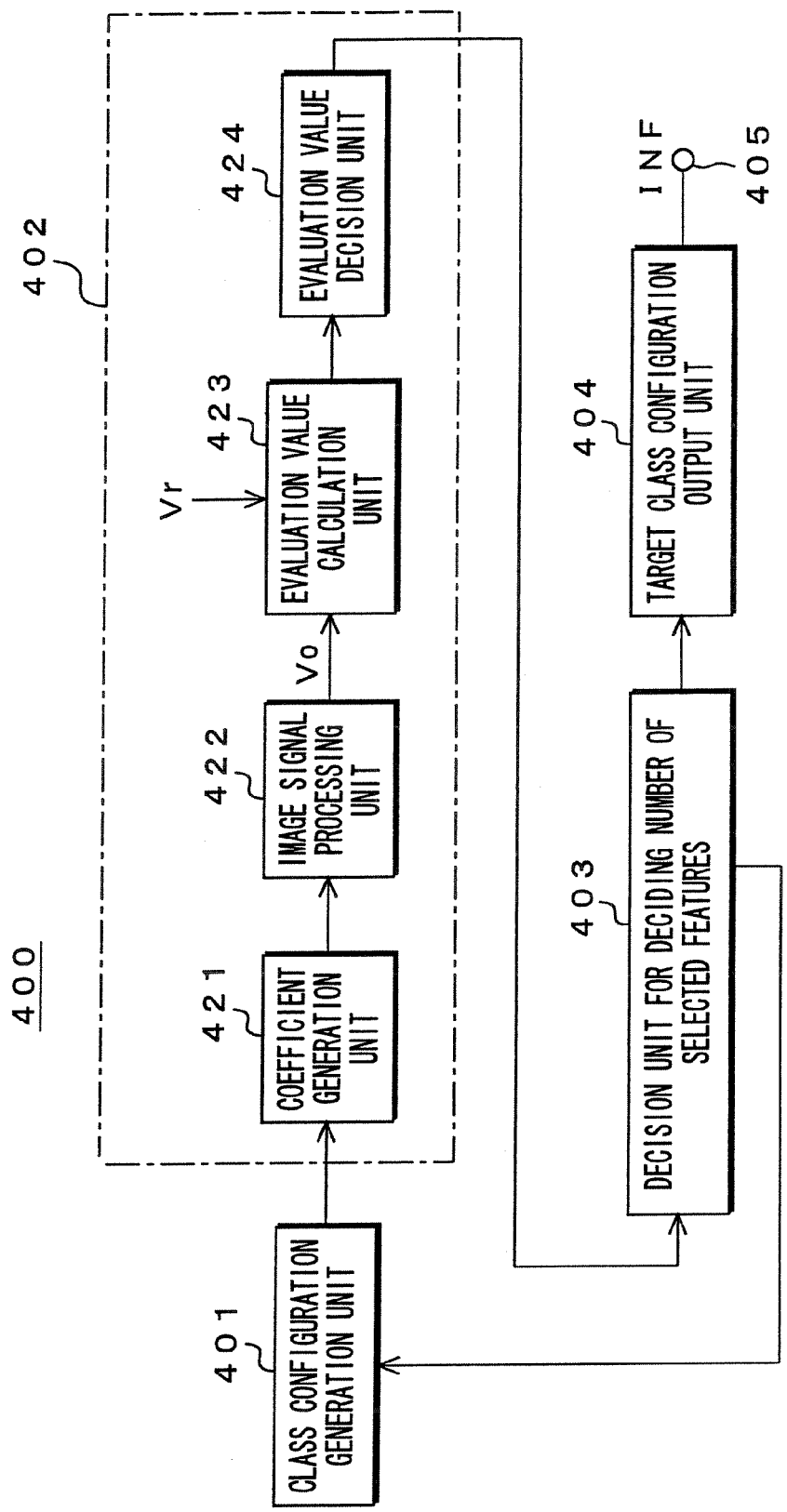
FIG. 12 is a block diagram for showing a configuration of the target class configuration generation apparatus.

FIG. 12 shows a configuration of a target class configuration generation apparatus 400.

This target class configuration generation apparatus 400 comprises a class configuration generation unit 401 for adding to i (which is an integer) number of the already selected features a feature selected from the remaining (n−i) number of the features to generate (n−i) number of class configurations each including the (i+1) number of the features, and a class configuration selection unit 402 for selecting an optimal class configuration from the (n−i) number of class configurations (generated class configurations) using an arbitrary evaluation value.

Further, this target class configuration apparatus 400 also comprises a decision unit 403 for deciding whether the number of the selected features is r, M a target class configuration output unit 404 for, if the number of the selected features is r, outputting information of the selected r number of features as information INF of the target class configuration, and an output terminal 405 for outputting this information INF.

In this case, by using the features, which have been used in a class configuration selected by the class configuration selection unit 402, as the already selected features and repeating the above-mentioned operations by the class configuration generation unit 401 and the class configuration selection unit 402 with values for "i" sequentially varying from 0 to r−1, r number of the features are selected, thereby generating a target class configuration.

The class configuration selection unit 402 includes a coefficient generation unit 421, an image signal processing unit 422, an evaluation value calculation unit 423, and an evaluation value decision unit 424. The coefficient generation unit 421 generates items of coefficient data Wi for each class in (n−i) number of class configurations generated by the class configuration generation unit 401. This coefficient generation unit 421 generates the items of coefficient data Wi for each class in (n−i) number of class configurations utilizing, for example, the coefficient generation apparatus 300 shown in FIG. 9. Accordingly, it is possible to obtain the items of coefficient data for each class in (n−1) number of the respective generated class configurations by performing learning only once, thereby improving an efficiency of processing.

The image signal processing unit 422 converts, for each class configuration, an image signal that corresponds to an SD signal into an image signal that corresponds to an HD signal using the items of coefficient data for each class generated by the coefficient generation unit 421. This image signal processing unit 422 converts an image signal that corresponds to an SD signal into an image signal that corresponds to an HD signal using the image signal processing apparatus 100 shown in FIG. 1. In this case, the items of coefficient data Wi generated by the coefficient generation unit 421 are stored in the coefficient memory 105 beforehand. Further, the image signal that corresponds to the SD signal is supposed to have been made by performing thinning-out processing horizontally and vertically on an evaluating image signal Vr that corresponds to the HD signal.

The evaluation value calculation unit 423 calculates, for each class configuration, an evaluation value based on a difference for each item of pixel data between an image signal Vo obtained as converted by the image signal processing unit 422 and the evaluating image signal Vr. For example, the evaluation value is an SNR given by the above-mentioned Equation (12). The evaluation value decision unit 424 selects an optimal class configuration based on an evaluation value of class configurations obtained by the evaluation value calculation unit 423. If the evaluation value is an SNR given by Equation (12), such a class configuration that this SNR is maximized is selected as an optimal class configuration.

The following will describe operations of the target class configuration generation apparatus 400 shown in FIG. 12.

First, the decision unit 403 sets "i" to 0 and gives an instruction to the class configuration generation unit 401 to generate n number of class configurations each including a feature. In accordance with the instruction, the class configuration generation unit 401 generates the class configurations and supplies information of each of these generated configurations to the class configuration selection unit 402.

The class configuration selection unit 402 selects an optimal class configuration from the class configurations (generated class configurations) generated by the class configuration generation unit 401, using an arbitrary evaluation value. In this case, such a class configuration that an SD signal can be converted into an HD signal best when classes are categorized on the basis of the evaluation value is selected as the optimal class configuration.

Information of the class configuration selected by the class configuration selection unit 402 is supplied to the decision unit 403. The decision unit 403 adds 1 to a value for "i" to provide i=2. If "i" is not equal to r, it supplies the class configuration unit 401 with information on the feature included in the class configuration selected by the class configuration selection unit 402 as information of the already selected feature, thereby giving an instruction to generate (n−1) number of class configurations each including two features.

The class configuration generation unit 401 generates the class configurations in accordance with the instruction and supplies the information on each of the generated class configurations to the class configuration selection unit 402. The class configuration selection unit 402 selects an optimal class configuration from the class configurations (generated class configurations) generated by the class configuration generation unit 401.

Information on the class configurations selected by the class configuration selection unit 402 is supplied to the decision unit 403. The decision unit 403 adds 1 to the value for "i" to provides i=3. If "i" is not equal to r, it supplies the class configuration unit 401 with information on the features included in the class configuration selected by the class configuration selection unit 402 as information on the already selected features and gives an instruction to generate (n−2) number of class configurations each including three features.

And so on, until the decision unit 403 decides that i=r, these operations are repeated. The decision unit 403, when having decided that i=r, supplies the target class configuration output unit 404 with information on the class configuration (information of r number of the features) finally selected by the class configuration selection unit 402. This output unit 404 outputs information INF of a target class configuration to the output terminal 405.

Figure 13:
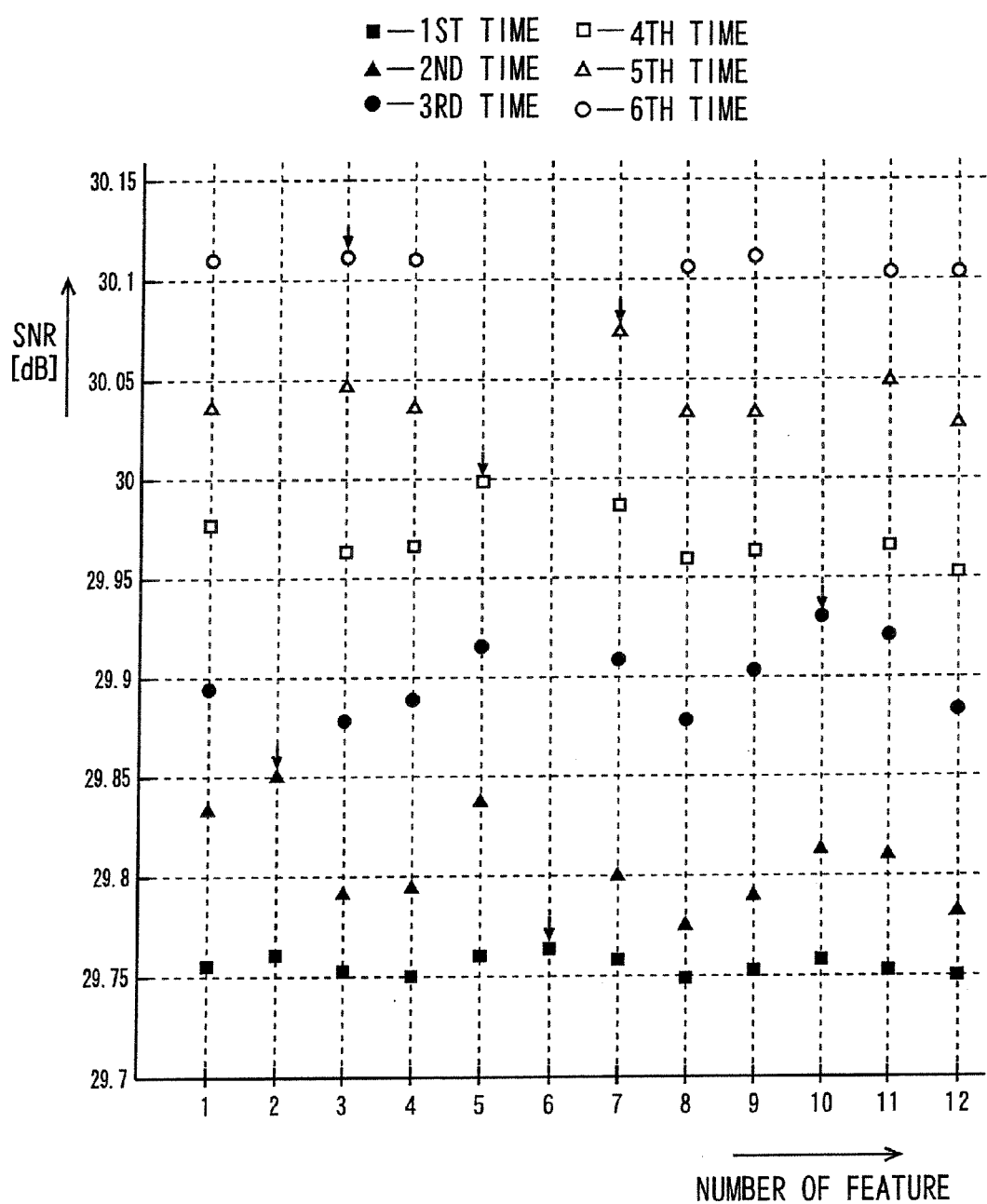
FIG. 13 shows an example of the processing for generating a target class configuration.

FIG. 13 shows an example of processing where a target class configuration has been generated by actually selecting six features from 12 features. A mark, "↓" indicates a feature, which is selected for each time.

For a first time, twelve class configurations each including a feature have been generated and, as a result of evaluation based on SNR, the class configuration that includes number 6 of the feature has been selected as an optimal class configuration. For a second time, eleven class configurations each including two features, i.e., the number 6 of the feature plus another feature, have been generated and, as a result of evaluation based on SNR, the class configuration that includes the numbers 6 and 2 of the features has been selected as an optimal class configuration. For a third time, ten class configurations each including three features, i.e., the numbers 6 and 2 of the features plus another feature, have been generated and, as a result of evaluation based on SNR, the class configuration that includes the numbers 6, 2, and 10 of the features has been selected as an optimal class configuration. For a fourth time, nine class configurations each including four features, i.e., the numbers 6, 2 and 10 of the features plus another feature, have been generated and, as a result of evaluation based on SNR, the class configuration that includes the numbers 6, 2, 10, and 5 of the features has been selected as an optimal class configuration. For a fifth time, eight class configurations each including five features, i.e., the numbers 6, 2, 10 and 5 of the features plus another feature, have been generated and, as a result of evaluation based on SNR, the class configuration that includes the numbers 6, 2, 10, 5, and 7 of the features has been selected as an optimal class configuration. For a sixth time, seven class configurations each including six features, i.e., the numbers 6, 2, 10, 5, and 7 of the features plus another feature, have been generated and, as a result of evaluation based on SNR, the class configuration that includes the numbers 6, 2, 10, 5, 7, and 3 of the features has been selected as an optimal class configuration.

As a result, the class configuration that includes the numbers 6, 2, 10, 5, 7 and 3 of the features has been selected as a target class configuration.

As described above, in the target class configuration generation apparatus 400 shown in FIG. 12, an operation of generating (n−i) number of class configurations each including the already selected "i" number of features plus a feature selected from (n−i) number of the remaining the features and an operation of selecting an optimal class configuration from these (n−i) number of class configurations using an arbitrary evaluation value are repeated with values for "i" sequentially varying from 0 to r−1 in which the features used in the selected class configuration are used as the already selected features, to select the r number of the features from the n number of the features and obtain a target class configuration including the r number of the features. This allows an optimal class configuration to be obtained in short time without relying on human experiences.

If, in this case, it is wished to generate class configurations by selecting r number of the features from n number of the features, the number of possible class configurations becomes $nCr=n!/\{(n-r)!r!\}$. For example, to generate class configurations by selecting six features from 12 features, the number of possible configurations is $12C6=924$. The number of class configurations becomes enormous as the numeral n becomes large. Therefore, it takes enormous time to evaluate each of the all class configurations, which is difficult to perform.

However, if the target class configuration generation apparatus 400 shown in FIG. 12 is used to generate an optimal class configuration, the number of class configurations required for comparison becomes $n+(n-1)+(n-2)+, \ldots , +(n-r+1)$. For example, to generate class configurations by selecting six features from 12 features, the number of class configurations required for comparison is $12+11+10+9+8+7=57$, thus resulting in a large decrease as compared to the case of evaluation performed for each of the all class configurations. Therefore, an optical class configuration can be obtained in short time.

It is to be noted that it has been confirmed experimentally that r number of features are roughly the same between a case where the r number of features are selected to thereby generate a target class configuration in the target class configuration generation apparatus 400 shown in FIG. 12 and a case where a target class configuration including the r number of features is obtained by evaluating each of the all class configurations.

Also processing in the target class configuration generation apparatus 400 of FIG. 12 can be realized by software, an apparatus for which processing is not shown though. In this case, processing for generating a target class configuration is executed in accordance with a procedure shown by the above-mentioned flowchart of FIG. 11.

In the above-mentioned image signal processing apparatus 100 shown in FIG. 1, for example, six features are selected from 12 features by the target class configuration generation apparatus 400 shown in FIG. 12, so that classes in a target class configuration including these selected six features are categorized. As described above, this target class configuration provides an optimal class configuration without relying on human experiences. Therefore, in the image signal processing apparatus 100, an SD signal can be converted into an HD signal by performing conversion processing accompanied by class categorization by use of an optimal class configuration.

Figure 14:
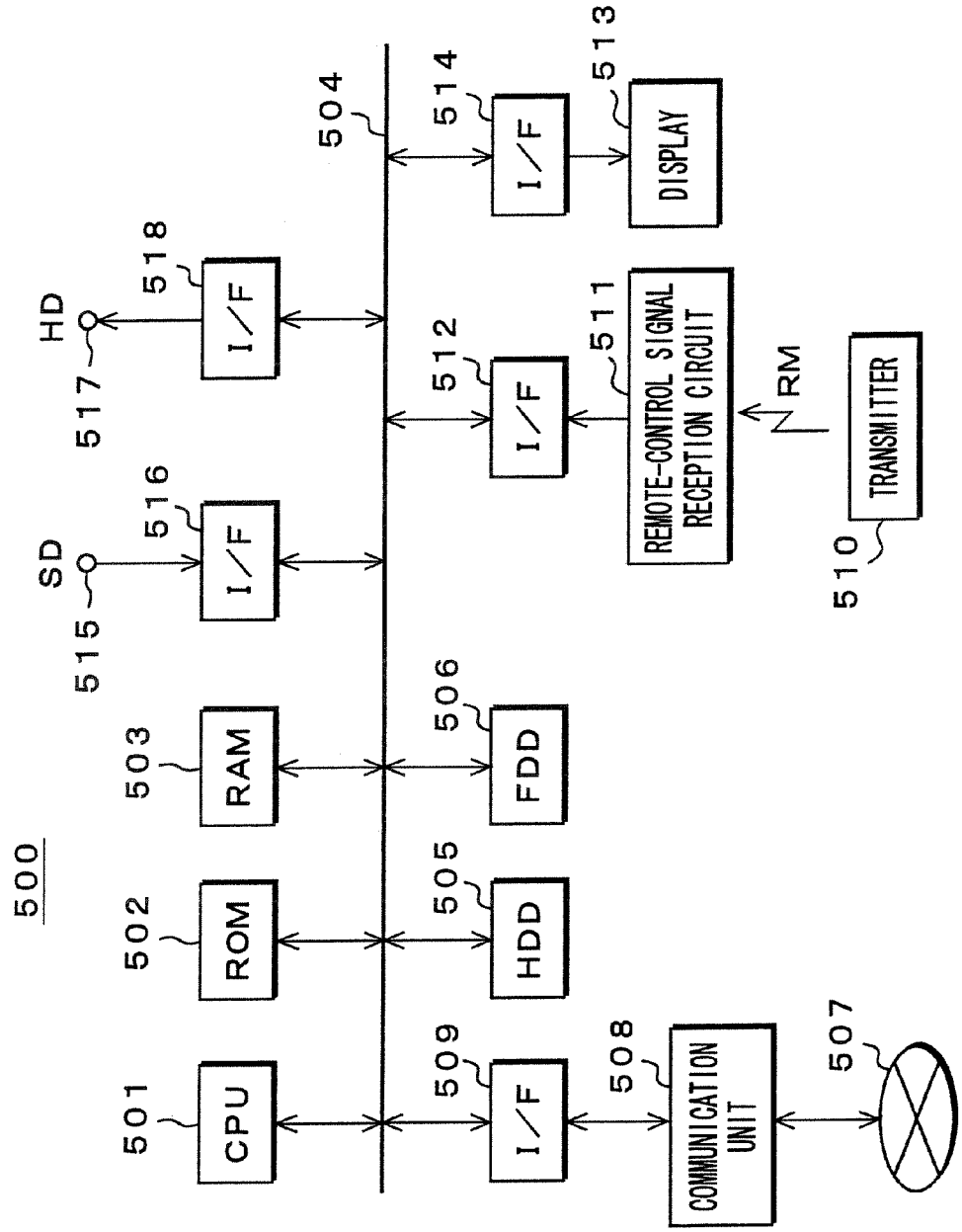
FIG. 14 is a block diagram for showing a configuration of the image signal processing apparatus to be realized by software.

It is to be noted that processing in the image signal processing apparatus 100 of FIG. 1 can be realized by software using such an image signal processing apparatus 500 as shown in FIG. 14, for example.

The following will describe the image signal processing apparatus 500 shown in FIG. 14. This image signal processing apparatus 500 comprises a CPU 501 for controlling operations of the entire apparatus, a read only memory (ROM) 502 for storing a control program of this CPU 501, coefficient data and the like, and a random access memory (RAM) 503 which constitutes a working area for the CPU501. These CPU 501, ROM 502, and RAM 503 are each connected to a bus 504.

The image signal processing apparatus 500 also comprises a hard disk drive (HDD) 505 as an external storage and a floppy (trademark) disk drive 506. These drive 505 and 506 are each connected to the bus 504.

The image signal processing apparatus 500 further comprises a communication unit 508 for connecting the apparatus 500 to a communication network 507 such as the Internet in wired or wireless communication. This communication unit 508 is connected via an interface 509 to the bus 504.

Further, the image signal processing apparatus 500 is equipped with a user interface unit. This user interface unit comprises a remote-control signal reception circuit 511 for receiving a remote-control signal RM from a remote-control transmitter 510 and a display 513 such as a cathode ray tube (CRT) and a liquid crystal display (LCD). The reception circuit 511 is connected via an interface 512 to the bus 504 and, similarly, the display 513 is connected via an interface 514 to the bus 504.

The image signal processing apparatus 500 comprises an input terminal 515 for receiving an SD signal and an output terminal 517 for outputting an HD signal. The input terminal 515 is connected via an interface 516 to the bus 504 and, similarly, the output terminal 517 is connected via an interface 518 to the bus 504.

It is to be noted that instead of storing the control program and the coefficient data etc. in the ROM502 beforehand as described above, the control program and coefficient data etc. way be downloaded from the communication network 507 such as the Internet via the communication unit 508 and stored in the hard disk drive 505 or the RAM303 and be used. Further, these control program and coefficient data etc. may be provided in a floppy disk.

Further, beforehand an SD signal to be processed may be recorded in the hard disk drive 505 or downloaded from the communication network 507 such as the Internet via the communication unit 508, instead of being input through the input terminal 515. Further, instead of or concurrently with outputting the processed HD signal to the output terminal 517, it my be supplied to the display 513 to display an image or stored in the hard disk drive 505 or sent via the communication unit 508 to the communication network 507 such as the Internet.

Figure 15:
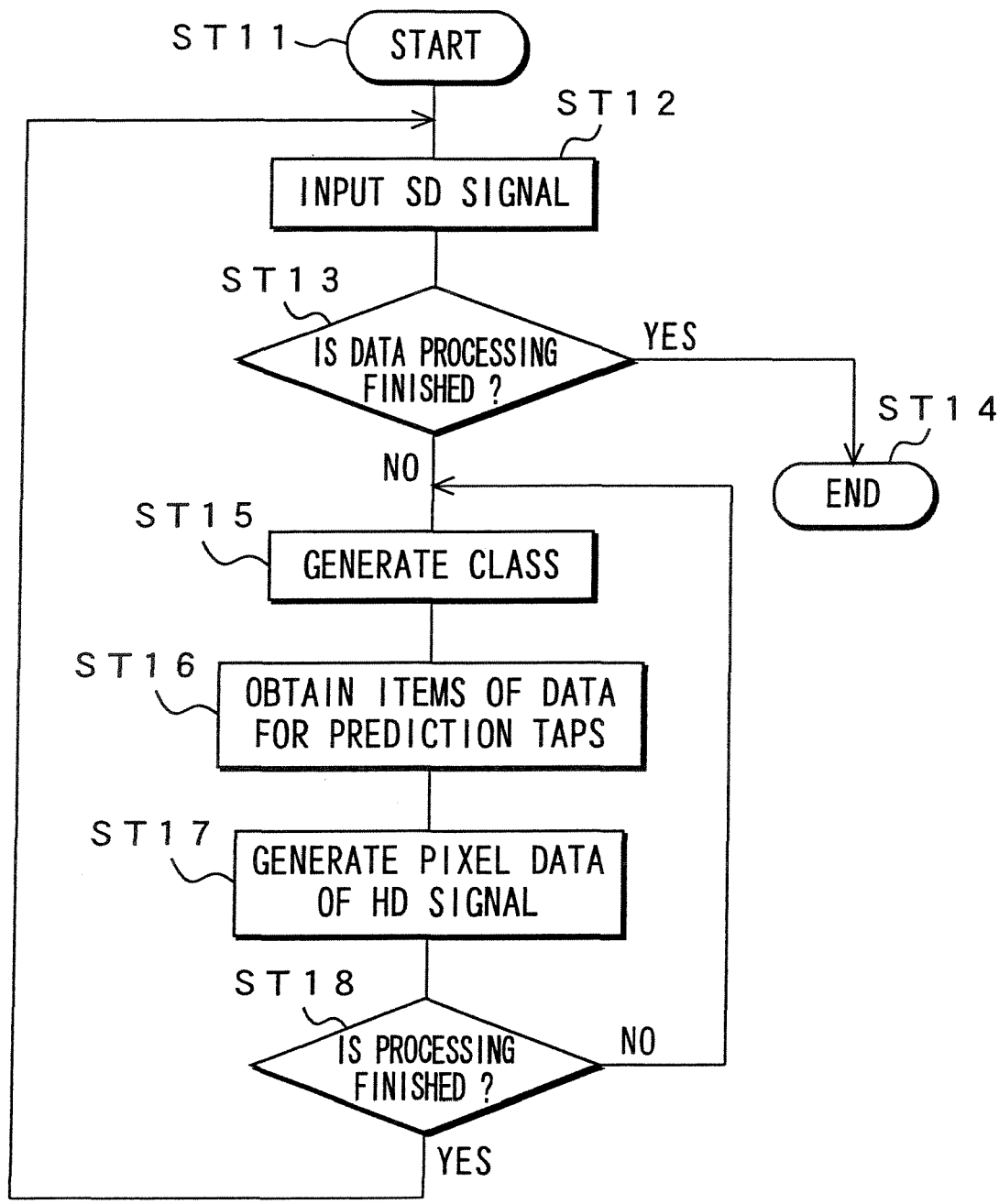
FIG. 15 is a flowchart for showing image signal processing.

The following will describe a processing procedure for obtaining an HD signal from an SD signal in the image signal processing apparatus 500 shown in FIG. 14, with reference to a flowchart of FIG. 15.

Processing starts at ST11 and, at ST12, one frame or one field of an SD signal is input into the apparatus through, for example, the input terminal 515. The SD signal thus input is stored in the RAM503 temporarily. It is to be noted that if the SD signal is recorded in the hard disk drive 505 in the apparatus beforehand, the SD signal is read from this drive 505 and the read SD signal is stored in the RAM503 temporarily.

At step ST13, it is decided whether processing of the entire frame or field of the SD signal is finished. If finished, the process goes to step ST14 to end the processing otherwise, the process goes to step ST15.

At step ST15, items of data for class taps positioned in the periphery of a target position in an HD signal are obtained from the SD signal. Based on these items of data of the class taps, a class CL to which pixel data of the target position in the HD signal belongs is generated. For example, as the items of data for the class taps, the items of data for five SD pixels are taken out, to generate a class CL in a target class configuration that includes six features.

At step ST16, items of data for prediction taps positioned in the periphery of the target position in the HD signal are obtained from the SD signal. At step ST17, items of coefficient data Wi that correspond to the class code CL generated at step ST15 and items of data xi for the prediction taps obtained at step ST16 are used to generate items of pixel data y of the target position in the HD signal based on the estimation equation of Equation (2).

At step ST18, it is decided whether the processing of obtaining pixel data of the HD signal is finished over all regions of the one frame or field of the SD signal input at step ST12. If finished, the process returns to step ST12 to shift to processing of inputting the next one frame or field of the SD signal. Otherwise, the process returns to step ST15 to shift to processing of the next target position.

By thus performing the processing along the flowchart shown in FIG. 15, it is possible to process pixel data of the SD signal, thereby obtaining pixel data of the HD signal. The HD signal thus obtained through the processing is output from the output terminal 517 or supplied to the display 513 where an image due to it is displayed or to the hard disk drive 505 where it is recorded.

Further, also processing in the normal equation generation apparatus 200 of FIG. 8 can be realized by software, an apparatus for which processing is not shown though.

Figure 16:
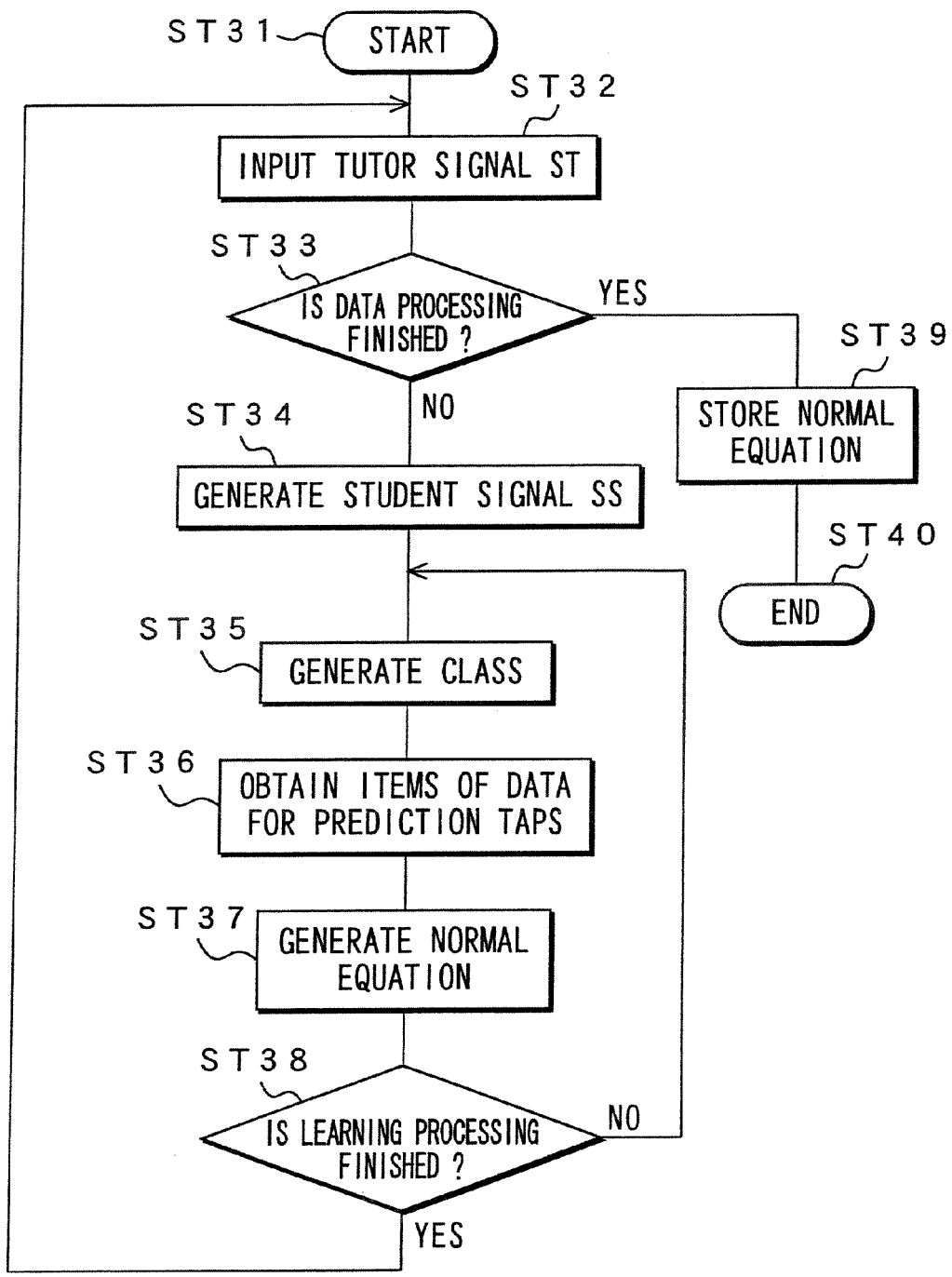
FIG. 16 is a flowchart for showing processing for generating a normal equation.

The following will describe a processing procedure for generating coefficient data, with reference to a flowchart of FIG. 16.

At step ST31, the processing starts and, at step ST32, one frame or field of an HD signal as a tutor signal ST is input. At step ST33, it is decided whether the entire frame or field of the tutor signal ST is finished. If it is yet to be finished, the process goes to step ST34 to generate an SD signal as a student signal SS from the tutor signal ST input at step ST32.

At step ST35, items of data for class taps positioned in the periphery of a target position in the tutor signal ST are obtained from the student signal SS. Based on these items of data for the class taps, a class CLr to which pixel data of the target position in the tutor signal ST belongs is generated. In this case, for example, as the items of data for class taps, items of data for five SD pixels are taken out, to generate a class CLr in a basic class configuration that includes 12 features.

At step ST36, items of data for prediction taps positioned in the periphery of the target position in the tutor signal ST are obtained from the student signal SS. At step ST37, the class code CLr generated at step ST35, items of data xi for the prediction taps obtained at step ST36, and the items of pixel data y of the target position in the tutor signal ST are used to perform addition for the purpose of obtaining a normal equation indicated in Equation (9) (see Equations (7) and (8)) for each class.

At step ST38, it is decided whether learning processing is finished over the entire region of the one frame or field of the tutor signal ST input at step ST32. If finished, the process returns to step ST32 to input the next one frame or field of the tutor signal ST. Otherwise, the process returns to step ST35 to shift to the processing of the next target position.

If it is decided that the processing is finished at the above-mentioned step ST33, the process goes to step ST39 to save in the memory the data of the normal equation of each class in a basic class configuration generated by the above-mentioned addition processing performed at step ST37 and then goes to step ST40 to end the processing.

By thus performing the processing along the flowchart shown in FIG. 16, a normal equation for calculating respective items of the coefficient data Wi of each class in a basic class configuration is generated by the same method as that employed in the normal equation generation apparatus 200 shown in FIG. 8.

Also, processing in the coefficient generation apparatus 300 of FIG. 9 can be realized by software, apparatus for which processing is not shown though.

Figure 17:
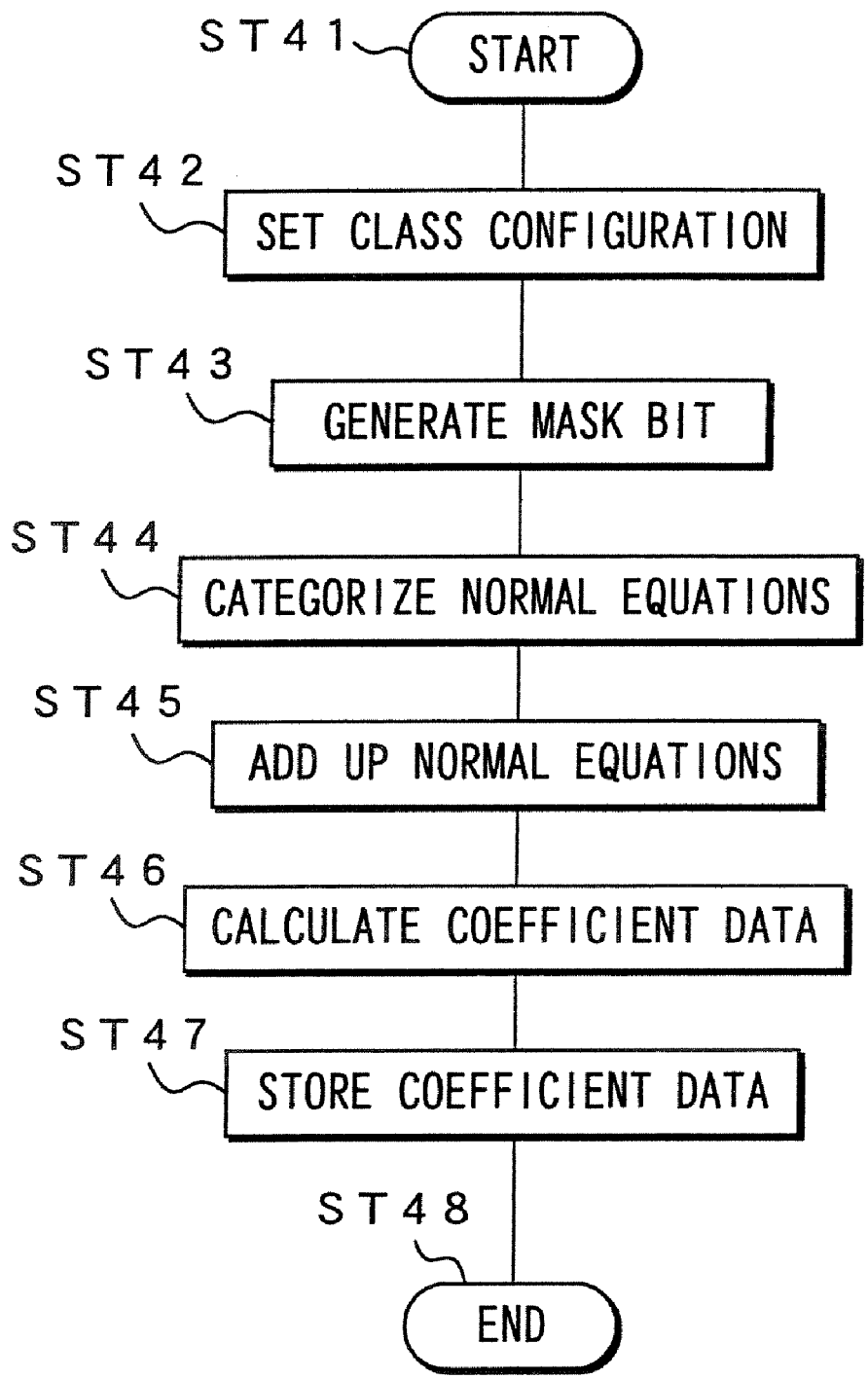
FIG. 17 is a flowchart for showing processing for generating a coefficient.

The following will describe a processing procedure for generating coefficient data, with reference to a flowchart of FIG. 17.

At step ST41, the processing starts and, at step ST42, a target class configuration is set. At step ST43, based on information INF of the set target class configuration, 12-bit mask bit pattern data MBP is generated in which a bit corresponding to a feature included in the target class configuration is set to "1".

At step ST44, normal equations for calculating coefficient data for each class in the basic class configuration are categorized to the same group that corresponds to each class in the target class configuration. Therefore, a logical product of each bit of the 12-bit data that represents the classes (as many as 4096) of the basic class configuration and each bit of the 12-bit mask bit pattern data MBP is calculated, so that the classes in the basic class configuration that have the same bit pattern of a calculation result are categorized into the same group, thereby detecting such classes in the basic class configuration as to correspond to each class in the target class configuration.

At step ST45, for each group, the normal equations for calculating the items of coefficient data for each class in the basic class configuration that have been categorized as to correspond to each class in the target class configuration are added up to generate a normal equation for calculating the coefficient data for each class in the target class configuration.

At step ST46, each of the normal equations generated at step ST45 is solved to generate the items of coefficient data Wi for each class in the target class configuration. The items of coefficient data Wi are saved in the coefficient memory at step 47, whereupon at step 48, the processing ends.

By thus performing the processing along the flowchart of FIG. 17, it is possible to obtain the coefficient data for each class in the target class configuration using the same method as that employed in the coefficient generation apparatus 300 shown in FIG. 9.

Figure 18:
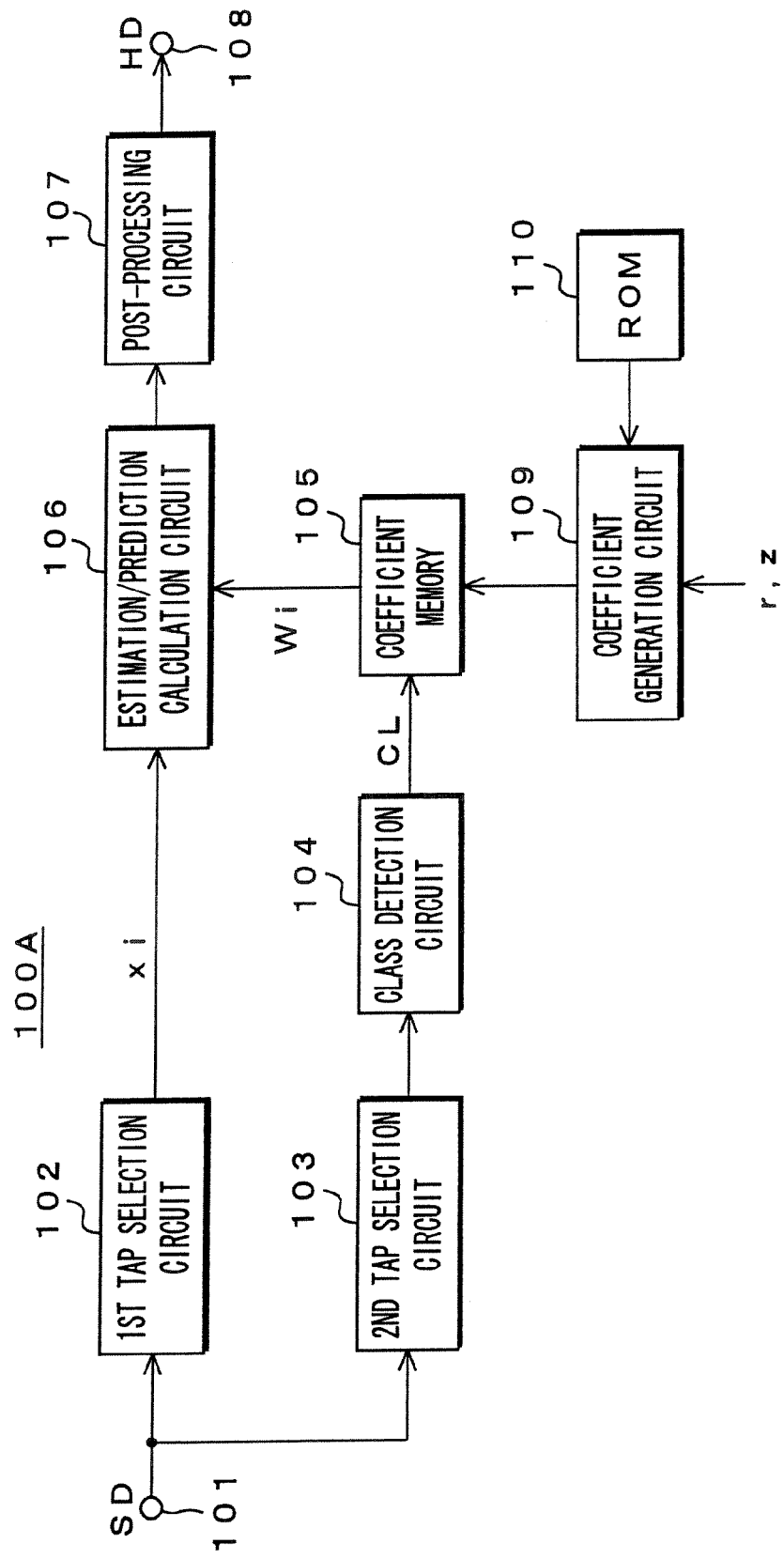
FIG. 18 is a block diagram for showing a configuration of another image signal processing apparatus.

The following will describe an additional embodiment of the present invention. FIG. 18 shows a configuration of an image signal processing apparatus 100A therefor. In contrast to the image signal processing apparatus 100 shown in FIG. 1 in which the coefficient data Wi for each class in a target class configuration is stored in the coefficient memory 105, in the image signal processing apparatus 100A shown in FIG. 18 coefficient seed data, which is coefficient data in a generation equation for generating the coefficient data Wi for each class in the target class configuration, is stored in an ROM and used to generate the coefficient data Wi. In FIG. 18, components corresponding to those in FIG. 1 are indicated by the same symbols and their detailed description is omitted.

The image signal processing apparatus 100A comprises an ROM 110. In this ROM 110, the coefficient seed data for each class in a target class configuration is accumulated beforehand. This coefficient seed data is coefficient data in a generation equation for generating the coefficient data Wi to be stored in the coefficient memory 105.

As described above, by an estimation/prediction calculation circuit 106, items of data xi for prediction taps and items of coefficient data Wi read from the coefficient memory 105 are used to calculate items of HD pixel data y to be made, using an estimation of Equation (2).

Items of coefficient data Wi ($i=1-n$) in this estimation equation are generated by a generation equation having parameters r and z in it as indicated in following Equation (13).

$$W_i = w_{i0} + w_{i1}r + w_{i2}z + w_{i3}r^2 + w_{i4}rz + w_{i5}z^2 + w_{i6}r^3 + w_{i7}r^2z + w_{i8}rz^2 + w_{i9}z^3 \quad (13)$$

In this equation, r is a parameter that determines a resolution and z is a parameter that determines a noise cancellation degree.

The ROM 110 stores items of coefficient seed data $w_{i0}$-through $w_{i9}$ ($i=1\sim n$), which are coefficient data in this generation equation, for each combination of a class and a pixel position (see HD1-HD4 of FIG. 6, HD1'-HD4' of FIG. 7). How to generate this coefficient seed data will be described later.

Further, the image signal processing apparatus 100A comprises a coefficient generation circuit 109 for using items of the coefficient seed data for each class in a target class configuration and values of the parameters r and z to generate items of the coefficient data Wi ($i=1\sim n$) in an estimation equation that corresponds to the values of the parameters r and z, using Equation (13), for each combination of the class and the output pixel position. In this coefficient generation circuit 109, the items of coefficient seed data $w_{i0}$ through $w_{i9}$ are loaded from the ROM 110. Further, this coefficient generation circuit 109 is supplied with values of the parameters r and z.

The items of coefficient data Wi ($i=1\sim n$) of each class in the target class configuration generated by this coefficient generation circuit 109 are stored in the above-mentioned coefficient memory 105. The items of coefficient data Wi are generated in this coefficient generation circuit 109 in each vertical blanking period, for example. Accordingly, even if values of the parameters r and z are changed by user operations, the items of coefficient data Wi for each class stored in the coefficient memory 105 can be changed immediately so as to correspond to these values of the parameters r and z, thereby permitting the user to smoothly adjust the resolution and the noise cancellation degree thereof.

The other components of the image signal processing apparatus 100A are constituted and operate similar to those of the image signal processing apparatus 100 shown in FIG. 1.

The following will describe how to generate items of coefficient seed data $w_{i0}$ through $w_{i9}$ ($i=1-n$) for each class in the target class configuration to be stored in the ROM110.

A normal equation is prepared for calculating respective items of the coefficient seed data for each class in a basic class configuration which is comprised of all of the 12 features. This normal equation is obtained by performing learning beforehand. A learning method will be described.

For the following description, tj (j=0-9) is defined as in Equation (14).

$$t0=1, t1=r, t2=z, t3=r^2, t4=rz, t5=z^2, t6=r^3, t7=r^2z,$$
$$t8=rz^2, t9=z^3 \quad (14)$$

By using Equation (14), Equation (13) is rewritten into Equation (15).

$$W_j = \sum_{i=0}^{9} w_{ij} t_i \quad (15)$$

Finally, an undetermined coefficient wij is obtained by learning. That is, multiple items of SD pixel data and HD pixel data are used for each combination of a class and an output pixel position to determine a coefficient data that minimizes a square error. This solution is referred to as "a least-squares method". Assuming that the number of learning times is m, a residual error in a k'th ($1 \leq k \leq m$) items of learning data is ek, and a total sum of square errors is E, E is expressed by following Equation (16) using Equations (2) and (13).

$$E = \sum_{k=1}^{m} e_k^2 \quad (16)$$

$$= \sum_{k=1}^{m} [y_k - (W_1 x_{1K} + W_2 x_{2K} + \cdots + W_n x_{nK})]^2$$

$$= \sum_{k=1}^{m} \{y_k - [(t_0 w_{10} + t_1 w_{11} + \cdots + t_9 w_{n19}) x_{1k} + \cdots + (t_0 w_{n0} + t_1 w_{n1} + \cdots + t_9 w_{n9}) x_{nk}]\}^2$$

$$= \sum_{k=1}^{m} \{y_k - [(w_{10} + w_{11} r + \cdots + w_{19} z^3) x_{1k} + \cdots + (w_{n0} + w_{n1} r + \cdots + w_{n9} z^3) x_{nk}]\}^2$$

In this equation, xik indicates a k'th items of pixel data at an i'th prediction tap position in an SD image and yk indicates a corresponding k'th items of pixel data in an HD image.

According to a solution by means of the least-squares method, such a wij value that a partial differentiation due to wij in Equation (16) may be 0 is obtained. This is indicated by following Equation (17).

$$\frac{\partial E}{\partial w_{ij}} = \sum_{k=1}^{m} 2 \left( \frac{\partial e_k}{\partial w_{ij}} \right) e_k \quad (17)$$

$$= -\sum_{k=1}^{m} 2 t_j x_{ik} e_k$$

$$= 0$$

Then, by defining Xipjq and Yip as indicated in following Equations (18) and (19) respectively, Equation (17) is rewritten into Equation (20) using a matrix.

$$X_{ipjq} = \sum_{k=1}^{m} x_{ik} t_p x_{jk} t_q \quad (18)$$

$$Y_{ip} = \sum_{k=1}^{m} x_{ik} t_p y_k \quad (19)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} \quad (20)$$

$$\begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix}$$

This Equation (20) is a normal equation for calculating items of coefficient seed data. By solving this normal equation by a general solution such as a sweeping-out method (Gauss-Jordan's elimination method), the items of coefficient seed data wi0 through wi9 (i=1~n) can be obtained.

Figure 19:
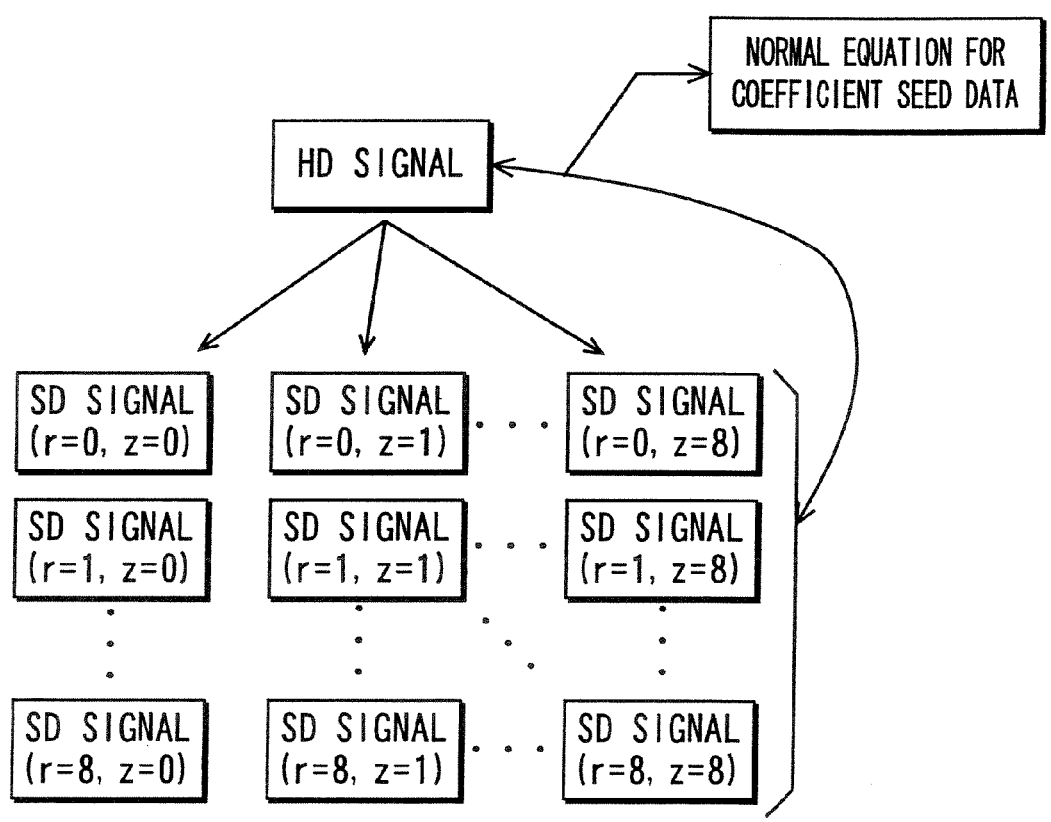
FIG. 19 is a diagram for explaining a method for generating a normal equation for coefficient seed data.

FIG. 19 shows a concept of a method of generating a normal equation for calculation of this coefficient seed data. A plurality of SD signals as student signals SS is generated from an HD signal as a tutor signal ST. In this case, by altering a frequency response of a thinning-out filter used to generate SD signals from an HD signal, the SD signals having a different resolution are generated.

The SD signals having a different resolution enable coefficient seed data having a different effect of increasing the resolution to be generated. For example, if there are an SD signal giving an image having a large blur and an SD signal giving an image having a small blur, by performing learning using the SD signal giving the image having the large blur, coefficient seed data having a large effect of increasing the resolution is generated, while by performing learning using the SD signal giving the image having the small blur, coefficient seed data having a small effect of increasing the resolution is generated.

Further, by adding noise to each of the SD signals having different resolutions, SD signals having the noise are generated. By varying a quantity of noise to be added, SD signals having different quantities of noise are generated, thereby generating items of coefficient seed data having different effects of canceling noise. For example, if there are an SD signal to which a large quantity of noise is added and an SD signal to which a small quantity of noise is added, by performing learning using the SD signal to which the large quantity of noise is added, coefficient seed data having a large effect of noise cancellation is generated, while by performing learning using the SD signal to which the small quantity of noise is added, coefficient seed data having a small effect of noise cancellation is generated.

The quantity of noise to be added is adjusted by, as indicated in, for example, following Equation (21), varying G when generating a pixel value x' of a noise-added SD signal by adding noise n to a pixel value x of an SD signal.

$$x' = x + G \cdot n \quad (21)$$

For example, by varying the parameter r in nine steps of 0-8 which parameter changes a frequency response and varying the parameter z in nine steps of 0-8 which parameter changes the quantity of noise to be added, a total 81 kinds of SD signals are generated. By performing learning between the plurality of SD signals thus generated and an HD signal, coefficient seed data is generated. These parameters r and z correspond to the parameters r and z in the image signal processing apparatus 100A shown in FIG. 18.

Next, by considering only six features included in a target class configuration of 12 features included in the basic class configuration and adding up normal equations of each of such class in the basic class configuration that have the same as those, a normal equation is generated for calculating respective items of coefficient seed data for each class in the target class configuration. These normal equations are added up by the same way as in the above-mentioned case of generating a generation equation for calculating coefficient data for each class in a target class configuration (see Equations (10-1) through (10-64) and (11)).

Next, the normal equations thus generated for calculation of coefficient seed data for each class in a target class configuration are solved to obtain the coefficient seed data for each class in the target class configuration. In this case, these normal equations are solved by a general solution such as the sweeping-out method.

Figure 20:
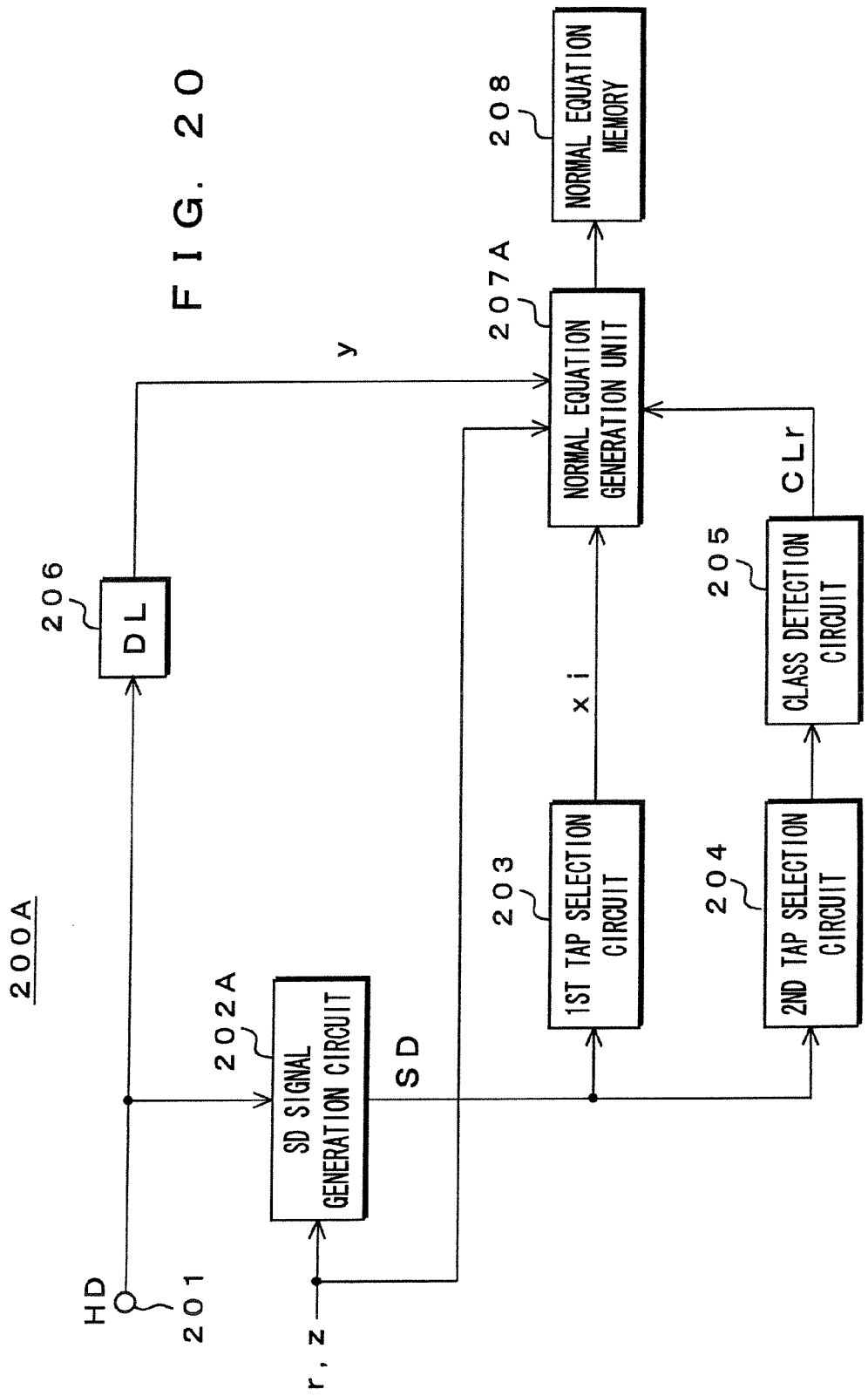
FIG. 20 is a block diagram for showing a configuration of another normal equation generation apparatus.

FIG. 20 shows a configuration of another normal equation generation apparatus 200A for generating a normal equation for calculating respective items of coefficient seed data for each class in a basic class configuration comprised of all of 12 features. In FIG. 20, components that correspond to those in FIG. 8 are indicated by the same symbols and their detailed description is omitted.

The normal equation generation apparatus 200A comprises an SD signal generation circuit 202A for perform thinning-out processing horizontally and vertically on an HD signal as a tutor signal input to an input terminal 201 to obtain SD signals as student signals. This SD signal generation circuit 202A receives the parameters r and z. In accordance with the parameter r, a frequency response of a thinning-out filter used to generate the SD signals from an HD signal is varied. Also, in accordance with the parameter z, a quantity of noise to be added to each SD signal is varied. The SD signal generated by this SD signal generation circuit 202A is supplied to a first tap selection circuit 203 and a second tap selection circuit 204.

Further, the normal equation generation circuit 200A also comprises a normal equation generation unit 207A. This normal equation generation unit 207A uses each of the items of HD pixel data y as pixel data of a target position obtained from an HD signal delayed by a time-adjusting delay circuit 206, items of data xi of prediction taps selectively taken out from the first tap selection circuit 203 corresponding to each of these items of HD pixel data y, a class code CLr obtained from a class detection circuit 205 corresponding to each of the items of HD pixel data y, and the parameters r and z, to generate a normal equation (see Equation 20) for obtaining items of coefficient seed data wi0 through wi9 (i=1–n) for each class in a basic class configuration for each combination of a class and an output pixel position. Items of data of the normal equations generated by this normal equation generation unit 207A are stored in a normal equation memory 208.

The other components of the normal equation generation apparatus 200A shown in FIG. 20 are constituted the same way as those of the normal equation generation apparatus 200 shown in FIG. 8.

The following will describe operations of the normal equation generation apparatus 200A shown in FIG. 20.

On an HD signal input to an input terminal 201, horizontal and vertical thinning-out processing is performed by the SD signal generation circuit 202A to generate SD signals as the student signals. In this case, the parameters r and z are supplied as control signals to the SD signal generation circuit 202A, to sequentially generate a plurality of SD signals having frequency responses and added quantities of noise that are varied step-wise.

From the SD signals obtained from the SD signal generation circuit 202A, items of data of five SD pixels as class taps positioned in the periphery of a target position in the HD signal are selectively taken out by the second tap selection circuit 204. These items of data of class taps are supplied to the class detection circuit 205. The class detection circuit 205 performs ADRC processing on the items of data of the five SD pixel respectively as the class taps to obtain a 2-bit code Qi, a 2-bit code (DR class) from a dynamic range DR of each of the items of data of the five SD pixels as the class taps, and 12-bit pattern data by interconnecting these, as a class CLr.

Further, from the SD signals obtained from the SD signal generation circuit 202A, the first tap selection circuit 203 selectively takes out items of data xi of prediction taps positioned in the periphery of the target position in the HD signal. The normal equation generation unit 207A uses each of the items of HD pixel data y as pixel data of the target position obtained from the HD signal time-adjusted by the delay circuit 206, items of the data xi of prediction taps selectively taken out from the first tap selection circuit 203 corresponding to each of these items of HD pixel data y, a class code CLr obtained from the class detection circuit 205 corresponding to each of the items of HD pixel data y, and the parameters r and z, to generate a normal equation (see Equation 20) for generating items of coefficient seed data wi0 through wi9 (n=1~9) for each combination of a class and an output pixel position. Data of these normal equations is stored in the normal equation memory 208.

The items of coefficient seed data wi0 through wi9 (n=1-9) for each class in a target class configuration to be stored in the ROM110 in the image signal processing apparatus 100A of FIG. 18 can be generated in the above-mentioned coefficient generation apparatus 300 of FIG. 9 as in the case of generating the items of coefficient data Wi (i=1–n) for each class in the target class configuration.

However, in this case, in place of the items of data of normal equations for calculating the coefficient data which are generated by the normal equation generation apparatus 200 shown in FIG. 8, items of data of the normal equations for calculating the coefficient seed data which are generated by the normal equation generation apparatus 200A of FIG. 20 are stored in the ROM 301.

In this case, at the normal equation adding-up unit 304, normal equations for calculating coefficient seed data for each class in the basic class configuration that have been categorized by the normal equation categorization unit 303 into the same group so as to correspond to each class in the target class configuration are added up for each group, thereby generating a normal equation for calculating coefficient seed data for each class in the target class configuration.

Further, in this case, for each of the output pixels (HD1-HD4 of FIG. 6, HD1'-HD4' of FIG. 7), the normal equations are added up. Therefore, at the normal equation adding-up unit 304, a normal equation for calculating coefficient seed data for each class in the target class configuration is generated for each combination of the class and the output pixel position.

Then, data of the normal equation generated by the normal equation adding-up unit 304 for each combination of the class and the output pixel position is supplied to the operation unit 305. At this operation unit 305, this normal equation is solved to obtain items of coefficient seed data $wi0$ through $wi9$ (n=1-9) for each combination of the class and the output pixel position. These items of coefficient seed data $wi0$ through $wi9$ are stored in the coefficient memory 306.

In such a manner, using the coefficient generation apparatus 300 shown in FIG. 9, the items of coefficient seed data $wi0$ through $wi9$ to be stored in the ROM110 of the image signal processing apparatus 100A of FIG. 18 are generated for each combination of the class and the output pixel position.

Thus, storing the normal equations for calculating the coefficient seed data for each class in a basic class configuration that includes 12 features in the ROM301 beforehand, considering only the features in a target class configuration, detecting such classes in the basic class configuration that have the same as those, adding them up to thereby generate a normal equation for calculating coefficient seed data for each class in the target class configuration, and solving this normal equation allows the coefficient seed data for each class in the target class configuration to be generated, thereby efficiently generating the coefficient seed data for each class in an arbitrary class configuration by performing learning only once. Therefore, to alter the features included in a target class configuration, it is not necessary to perform learning again, thereby enabling coefficient seed data to be easily generated in short time.

It is to be noted that the processing in the image signal processing apparatus 100A of FIG. 18 can be realized also by software in such an image signal processing apparatus 500 as shown in FIG. 14, for example.

Figure 21:
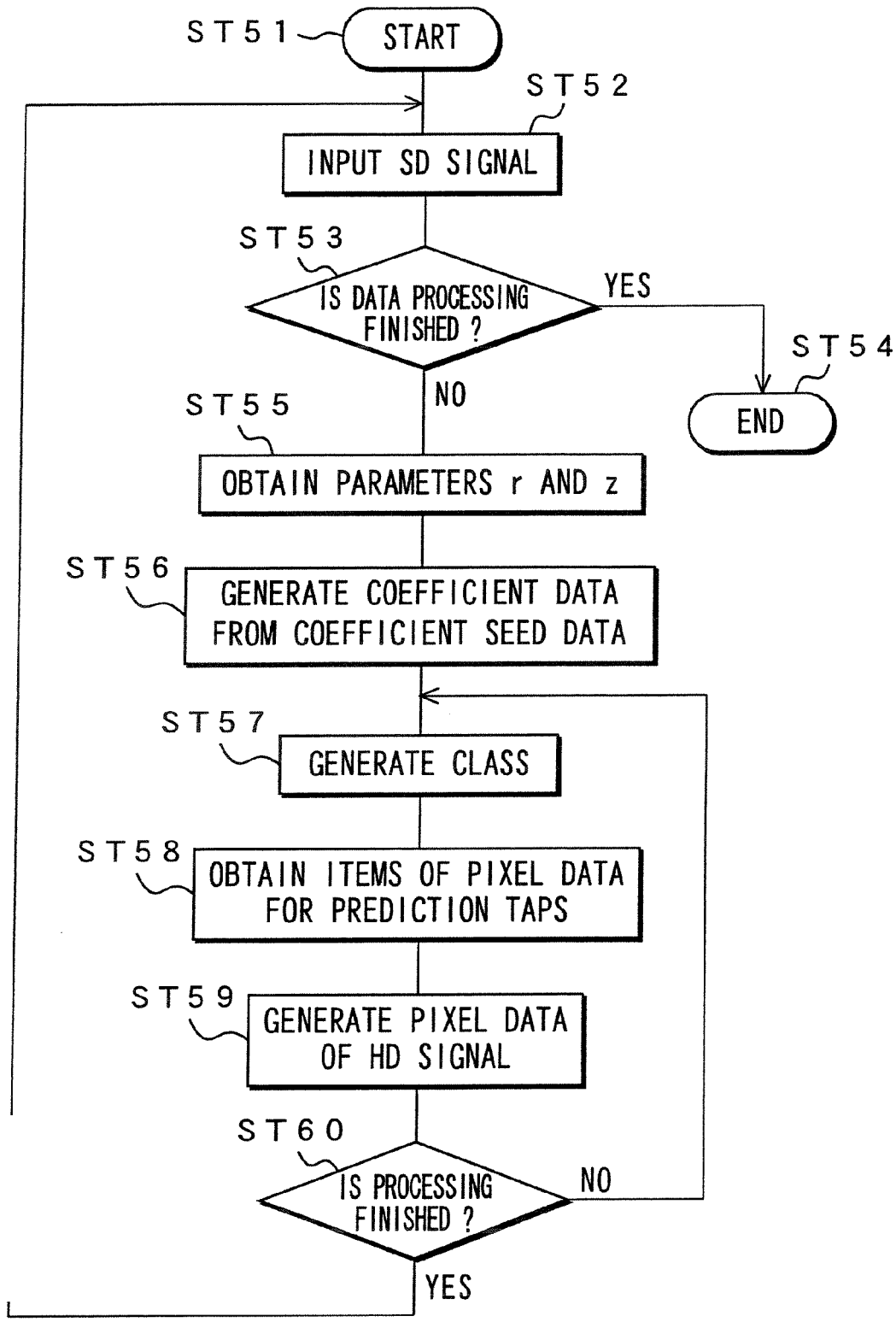
FIG. 21 is a flowchart for showing the image signal processing.

The following will describe a processing procedure for obtaining an HD signal from an SD signal in the image signal processing apparatus 500 shown in FIG. 14, with reference to a flowchart of FIG. 21.

Processing starts at step ST51 and, at step ST52, one frame or one field of an SD signal is input into the apparatus through, for example, the input terminal 515. The SD signal thus input is stored in the RAM503 temporarily. It is to be noted that if the SD signal is recorded in the hard disk drive 505 in the apparatus beforehand, the SD signal is read from this drive 505 and the read SD signal is stored in the RAM503 temporarily.

At step ST53, it is decided whether processing of the entire frame or field of the SD signal is finished. If finished, the process goes to step ST54 to end the processing. Otherwise, the process goes to step ST55.

At step ST55, values of the parameters r and z input by a user by operating the remote-control transmitter 510 are read from, for example, the RAM503. At step ST56, the obtained parameters r and z and the coefficient seed data for each class are used to generate the coefficient seed data Wi for the estimation equation (see Equation (2)) for each class in accordance with the generation equation (e.g., Equation (13)).

At step ST57, items of data of class taps positioned in the periphery of a target position in the HD signal are obtained from the SD signal and, based on these items of data of the class taps, a class CL to which pixel data of the target position in the HD signal belongs is generated. In this case, for example, as the items of data of the class taps, items of data of five SD pixels are taken out, to generate a class CL in a target class configuration that includes six features.

At step ST58, items of data of prediction taps positioned in the periphery of the target position in the HD signal are obtained from the SD signal. At step ST59, items of coefficient data Wi that correspond to the class code CL generated at step ST57 and items of data xi of the prediction taps obtained at step ST58 are used to generate items of pixel data y of the target position in the HD signal based on the estimation equation of Equation (2).

At step ST60, it is decided whether the processing of obtaining pixel data of the HD signal is finished over all regions of the one frame or field of the SD signal input at step ST52. If finished, the process returns to step ST52 to shift to the processing of inputting the next one frame or field of the SD signal. Otherwise, the process returns to step ST57 to shift to the processing of the next target position.

By thus performing the processing along the flowchart shown in FIG. 21, it is possible to process pixel data of the SD signal, thereby obtaining pixel data of the HD signal. The HD signal thus obtained through the processing is output from the output terminal 517 or supplied to the display 513 where an image due to it is displayed or to the hard disk drive 505 where it is recorded.

Further, also processing in the normal equation generation apparatus 200A of FIG. 20 can be realized by software, an apparatus for which processing is not shown though.

Figure 22:
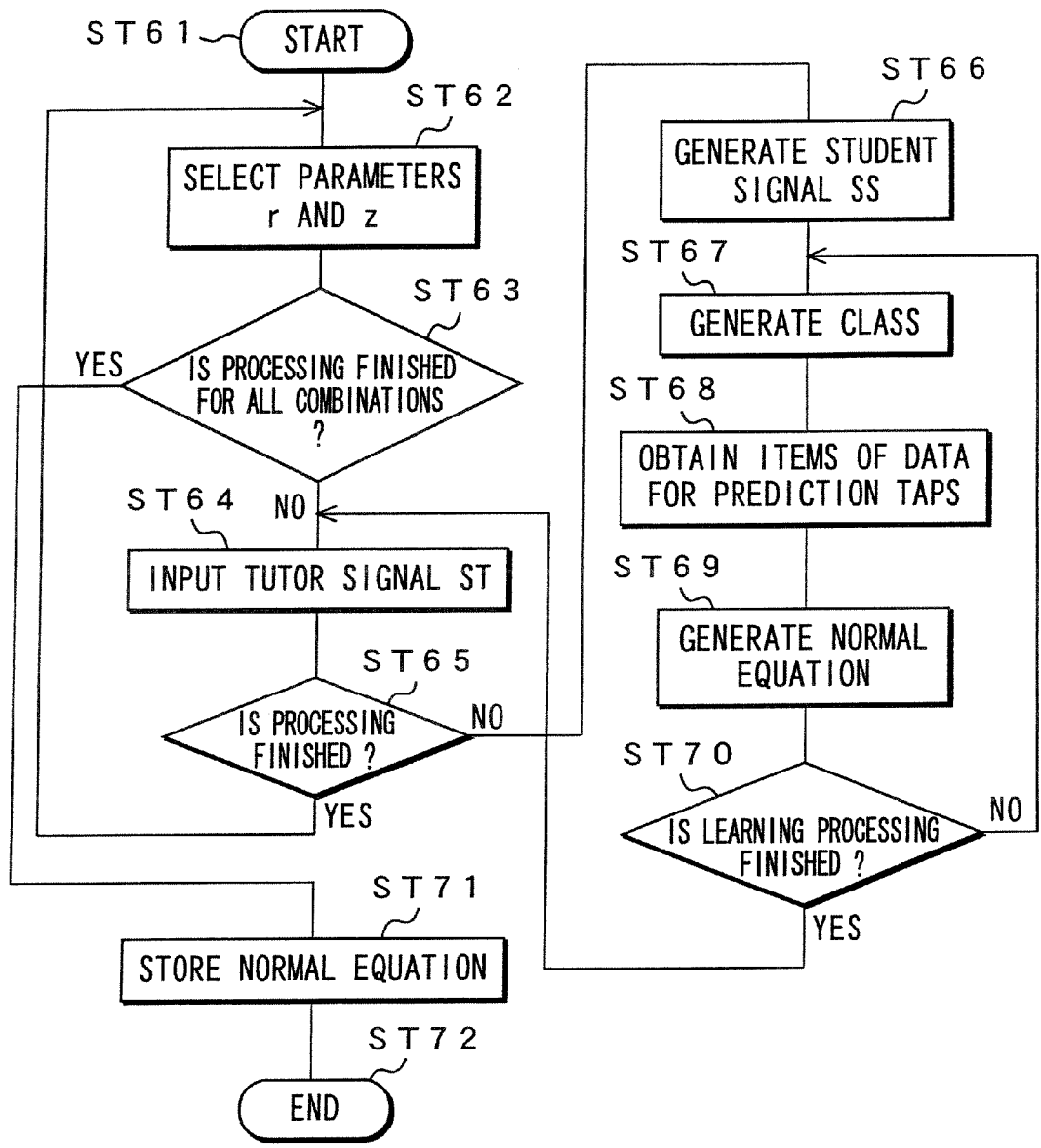
FIG. 22 is a flowchart for generating the normal equation.

The following will describe a processing procedure for generating coefficient data, with reference to a flowchart of FIG. 22.

Processing starts at step ST61 and, at step ST62, values of the parameters r and z to be used in learning are selected. At step ST63, it is decided whether learning is finished for all combinations of the values of the parameters r and z. If not finished, the process goes to step ST64.

At this step ST64, one frame or field of a known HD signal (a tutor signal) ST is input. At step ST65, it is decided whether the entire frame or field of the HD signal is processed. If finished, the process returns to step ST62 to select the next values of the parameters r and z and repeat the same processing as the above. Otherwise, the process goes to step ST66.

At step ST66, from the tutor signal ST input at step ST64, the SD signal is generated as a student signal SS. The SD signal has a frequency response and an added quantity of noise that correspond to the values of the parameters r and z selected at step ST62.

At step ST67, from the student signal SS, items of data of class taps positioned in the periphery of a target position in the tutor signal ST are obtained and, based on these items of data of class taps, a class CLr to which pixel data of the target position in the tutor signal ST belongs is generated. For example, as the items of data of class taps, items of data of five SD pixels are taken out to generate a class CLr in a basic class configuration that includes 12 features.

At step ST68, from the student signal SS, items of data of prediction taps positioned in the periphery of the target position in the tutor signal ST are obtained. At step ST69, the class code CLr generated at step ST67, items of data xi of the prediction taps obtained at step ST68, the values of the parameters r and selected at step ST62, and items of pixel data y of the target position in the tutor signal ST are used to perform addition for the purpose of obtaining the normal equation indicated by Equation (20) (see Equations (18) and (19)).

At step ST70, it is decided whether learning processing is finished over all regions of the pixel data of the one frame or field of the tutor signal ST input at step ST64. If finished, the process returns to step ST64 to input the next one frame or field of the tutor signal ST and repeat the same processing as the above. Otherwise, the process returns to step ST67 to shift to the processing of the next target position.

When it is decided at step ST63 that the learning is finished on all of combinations of the values of the parameters r and z, the process goes to step ST71. At this step ST71, items of data of the normal equation for each class in the basic class configuration generated by the addition processing at the above-mentioned step ST69 are saved in a memory and then, at step ST72, the processing ends.

By thus performing the processing along the flowchart shown in FIG. 22, it is possible to generate a normal equation for calculating coefficient seed data for each class using the same method as that employed in the normal equation generation apparatus 200A shown in FIG. 20.

Although in the above embodiments, the basic class configuration has included 12 features, the present invention is not limited to it. Although each of the features has been represented by one bit, the present invention can be applied similarly to a case where each of the features is represented by two bits or more.

Although the above embodiments have been described in an example where the SD signal is converted into the HD signal, the present invention is not limited to it and can be applied to any other cases where a first image signal is converted into a second image signal through conversion processing accompanied by class categorization.

Although in the above embodiments, an SNR indicated by Equation (12) is used as an evaluation value, the evaluation is not limited to it. In short, any evaluation value is acceptable as far as, when the classes are categorized on the basis of it, such a class configuration that the SD signal can be converted into the HD signal best is selected as an optimal class configuration.

Although the above embodiments have been described in a case where the informational signal is an image signal, the present invention is not limited to it. The present invention can be applied similarly to, for example, a case where the informational signal is an audio signal.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A class configuration generation apparatus for selecting r number of features from n number of the features, both of n and r being integers, r<n, to obtain a class configuration, said class configuration being used for generating, through class categorization, informational data of a target position in a second informational signal comprised of multiple items of informational data when converting a first informational signal comprised of multiple items of informational data into the second informational signal, said apparatus comprising:

a class configuration generation unit configured to generate (n−i) number of class configurations each including i number of the already selected features, said i being an integer, plus a feature selected from the remaining (n−i) number of the features; and a class configuration selection unit configured to select an optimal class configuration from the (n−i) number of the class configurations generated by the class configuration generation unit, using an arbitrary evaluation value, wherein the feature used in the class configuration selected by the class configuration selection unit is set as the already selected feature, and operations by the class configuration generation unit and the class configuration selection unit are repeated with values for said i sequentially varying from 0 to r−1, thereby obtaining a class configuration comprised of the r number of the features.

2. The class configuration generation apparatus according to claim 1, wherein the informational data of the target position in the second informational signal is generated using coefficient data for an estimation equation corresponding to a class to which the informational data of the target position belongs, based on this estimation equation; and wherein the class configuration selection unit includes: a coefficient generation unit configured to generate coefficient data for each class in (n−i) number of the generated class configurations; an informational signal processing unit configured to convert, for each class configuration, an informational signal corresponding to the first informational signal to an informational signal corresponding to the second informational signal using the coefficient data generated by the coefficient generation unit, said informational signal corresponding to the first informational signal being made from an evaluating informational signal that corresponds to the second informational signal; an evaluation value calculation unit configured to calculate, for each class configuration, an evaluation value based on a difference for each item of informational data between the informational signal obtained by the informational signal processing unit and the evaluating informational signal; and an evaluation value decision unit configured to decide the optimal class configuration based on the evaluation value of each of the class configurations obtained by the evaluation value calculation unit.

3. The class configuration generation apparatus according to claim 2, wherein the coefficient generation unit includes: a storage unit configured to store a normal equation for calculating any one of coefficient data for the estimation equation and coefficient seed data for each class in a basic class configuration comprised of all of n number of features, said coefficient seed data being coefficient data in a generation equation for generating the coefficient data for the estimation equation; a normal equation generation unit configured to consider, based on the information of (n−1) number of the generated class configurations, only the feature included in the generated class configuration for each class configuration and adding up the normal equation, which is stored in the storage unit, of a class in the basic class configuration, said class having the same feature, thereby generating a normal equation for calculating any one of the coefficient data for the estimation equation and the coefficient seed data for each class in the generated class configuration; and a calculation unit configured to solve the normal equation, generated by the normal equation generation unit, for each class in the generated class configuration, for each class configuration, to calculate the coefficient data for estimation equation and the coefficient seed data for each class in the generated class configuration.

4. A class configuration generation method for selecting r number of features from n number of the features, both of n and r being integers, r<n, to obtain a class configuration, said class configuration being used for generating, through class categorization, informational data of a target position in a second informational signal comprised of multiple items of informational data when converting a first informational signal comprised of multiple items of informational data into the second informational signal, said method comprising:

generating, by a processor, (n−i) number of class configurations each including i number of the already selected features, said i being an integer, plus a feature selected from the remaining (n−i) number of the features; and selecting an optimal class configuration from the (n−i) number of the class configurations generated by the generating, using an arbitrary evaluation value, wherein the feature used in the class configuration selected by the selecting is set as the already selected feature, and operations by the generating and the selecting are repeated with values for said i sequentially varying from 0 to r−1, thereby obtaining a class configuration comprised of the r number of the features.

5. A non-transitory computer readable storage medium including computer executable instructions, wherein the instructions, when executed by a computer, cause the computer to execute a class configuration generation method for selecting r number of features from n number of the features, both of n and r being integers, r<n, to obtain a class configuration, said class configuration being used for generating, through class categorization, informational data of a target position in a second informational signal comprised of multiple items of informational data when converting a first informational signal comprised of multiple items of informational data into the second informational signal, said method comprising:

generating (n−i) number of class configurations each being comprised of i number of the already selected features, said i being an integer, plus a feature selected from the remaining (n−i) number of the features; and selecting an optimal class configuration from the (n−i) number of the class configurations generated by the generating, using an arbitrary evaluation value, wherein the feature used in the class configuration selected by the selecting is set as the already selected feature, and operations by the generating and the selecting are repeated with values for said i sequentially varying from 0 to r−1, thereby obtaining a class configuration comprised of the r number of the features.

6. An informational signal processing apparatus for converting a first informational signal comprised of multiple items of informational data into a second informational signal comprised of multiple items of informational data, said apparatus comprising:

a class detection unit configured to detect, based on the first informational signal, a class in a predetermined class configuration to which informational data of a target position in the second informational signal belongs; and a coefficient generation unit configured to generate the informational data of the target position in the second informational signal in accordance with the class detected by the class detection unit, wherein the predetermined class configuration is comprised of r number of features selected from n number of the features, said n and r being integers, r<n; and wherein the r number of the features is obtained by repeating an operation of generating (n−i) number of class configurations each being comprised of i number of the already selected features plus a feature selected from the remaining (n−i) number of the features, said i being an integer, and an operation of selecting an optimal class configuration from the (n−i) number of the generated class configurations using an arbitrary evaluation value, with values for said i sequentially varying from 0 to r−1, in which the features used in the selected class configuration are set as the already selected features.

7. The informational signal processing apparatus according to claim 6, wherein the coefficient generation unit includes:

a coefficient data generation unit configured to generate coefficient data which is used in an estimation equation, said coefficient data corresponding to a class detected by the class detection unit;

a data selection unit configured to select multiple items of informational data based on the first informational signal, said informational data being positioned around a target position in the second informational signal; and a calculating unit configured to calculate the informational data of the target position in the second informational signal based on the estimation equation using the coefficient data generated by the coefficient data generation unit and the multiple items of informational data selected by the data selection unit.

8. An informational signal processing method for converting a first informational signal comprised of multiple items of informational data into a second informational signal comprised of multiple items of informational data, said method comprising:

detecting, based on the first informational signal, a class in a predetermined class configuration to which informational data of a target position in the second informational signal belongs; and generating, by a processor, the informational data of the target position in the second informational signal in accordance with the class detected by the detecting, wherein the predetermined class configuration is comprised of r number of features selected from n number of the features, said n and r being integers, r<n; and wherein the r number of the features is obtained by repeating an operation of generating (n−i) number of class configurations each including i number of the already selected features plus a feature selected from the remaining (n−i) number of the features, said i being an integer, and an operation of selecting an optimal class configuration from the (n−i) number of the generated class configurations using an arbitrary evaluation value, with values for said i sequentially varying from 0 to r−1, in which the features used in the selected class configuration are set as the already selected features.

9. A class configuration generation apparatus for selecting r number of features from n number of the features, both of n and r being integers, r<n, to obtain a class configuration, said class configuration being used for generating, through class categorization, informational data of a target position in a second informational signal comprised of multiple items of informational data when converting a first informational signal comprised of multiple items of informational data into the second informational signal, said apparatus comprising:

a class configuration generation means for generating (n−i) number of class configurations each being comprised of i number of the already selected features, said i being an integer, plus a feature selected from the remaining (n−i) number of the features; and a class configuration selection means for selecting an optimal class configuration from the (n−i) number of the class configurations generated by the class configuration generation means, using an arbitrary evaluation value, wherein the feature used in the class configuration selected by the class configuration selection means is set as the already selected feature, and operations by the class configuration generation means and the class configuration selection means are repeated with values for said i sequentially varying from 0 to r−1, thereby obtaining a class configuration comprised of the r number of features.

10. An informational signal processing apparatus for converting a first informational signal comprised of multiple items of informational data into a second informational signal comprised of multiple items of informational data, said apparatus comprising:
- a class detection means for detecting, based on the first informational signal, a class in a predetermined class configuration to which informational data of a target position in the second informational signal belongs; and
- coefficient generating means for generating the informational data of the target position in the second informational signal in accordance with the class detected by the class detection means,
- wherein the predetermined class configuration is comprised of r number of features selected from n number of the features, said n and r being integers, r<n; and wherein the r number of the features is obtained by repeating an operation of generating (n−i) number of class configurations each being comprised of i number of the already selected features plus a feature selected from the remaining (n−i) number of the features, said i being an integer, and an operation of selecting an optimal class configuration from the (n−i) number of the generated class configurations using an arbitrary evaluation value, with values for said i sequentially varying from 0 to r−1, in which the features used in the selected class configuration are set as the already selected features.

* * * * *